(12) United States Patent
Gaughan et al.

(10) Patent No.: US 10,946,850 B2
(45) Date of Patent: Mar. 16, 2021

(54) BRAKE CYLINDER MAINTAINING VALVE

(71) Applicant: Westinghouse Air Brake Technologies Corporation, Wilmerding, PA (US)

(72) Inventors: Edward W. Gaughan, Greensburg, PA (US); William John Potter, Trafford, PA (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 268 days.

(21) Appl. No.: 15/754,034

(22) PCT Filed: Mar. 7, 2017

(86) PCT No.: PCT/US2017/021072
§ 371 (c)(1),
(2) Date: Feb. 21, 2018

(87) PCT Pub. No.: WO2017/155934
PCT Pub. Date: Sep. 14, 2017

(65) Prior Publication Data
US 2018/0257626 A1   Sep. 13, 2018

Related U.S. Application Data

(60) Provisional application No. 62/304,595, filed on Mar. 7, 2016.

(51) Int. Cl.
*B60T 15/02* (2006.01)
*B61H 13/00* (2006.01)
(Continued)

(52) U.S. Cl.
CPC .......... *B60T 15/021* (2013.01); *B60T 13/665* (2013.01); *B60T 17/228* (2013.01); *B61H 13/00* (2013.01)

(58) Field of Classification Search
CPC ...... B60T 13/665; B60T 17/228; B60T 15/36; B60T 15/02; B60T 15/021; B60T 15/048;
(Continued)

(56) References Cited

U.S. PATENT DOCUMENTS 2,351,724 A * 6/1944 Vroman ................ B60T 8/3235
303/128
2,707,134 A * 4/1955 Cook .................... B60T 15/304
303/35
(Continued)

FOREIGN PATENT DOCUMENTS

WO   2016024996 A1   2/2016

OTHER PUBLICATIONS

International Preliminary Report on Patentability dated Sep. 11, 2018 for corresponding International Application No. PCT/US2017/021072.

*Primary Examiner* — Bradley T King
*Assistant Examiner* — Mahbubur Rashid
(74) *Attorney, Agent, or Firm* — Christopher R. Carroll; The Small Patent Law Group LLC

(57) ABSTRACT

A brake cylinder maintaining system includes a main valve comprising a first diaphragm, a second diaphragm, and a valve member, with the first diaphragm having a reference pressure on one side of the first diaphragm and a brake cylinder pressure on an opposite side of the first diaphragm. The second diaphragm having a brake cylinder pressure on one side of the second diaphragm with the first diaphragm configured to move between a first position and a second position based on a differential between the reference pressure and the brake cylinder pressure. The valve member is configured to place a brake cylinder in fluid communication with a brake pipe when the first and second diaphragm are each in the second position and configured to isolate a brake
(Continued)

cylinder from a brake pipe when the first diaphragm or the second diaphragm are in the first position.

20 Claims, 19 Drawing Sheets

(51) Int. Cl.
*B60T 13/66* (2006.01)
*B60T 17/22* (2006.01)

(58) Field of Classification Search
CPC ..... B60T 8/5012; B60T 8/5081; B61C 15/14; Y10T 137/2544
See application file for complete search history.

(56) References Cited

U.S. PATENT DOCUMENTS

| | | | | |
|---|---|---|---|---|
| 2,992,861 A * | 7/1961 | Hursen | ............... | B60T 15/184 303/33 |
| 3,001,832 A * | 9/1961 | McClure | ............... | B60T 15/54 303/68 |
| 3,610,707 A * | 10/1971 | Kondo | ............... | B60T 15/42 303/70 |
| 3,927,913 A * | 12/1975 | Rockwell | ............. | B60T 8/1818 303/9.67 |
| 3,948,083 A * | 4/1976 | Wickham | ............... | B60T 13/26 73/39 |
| 4,025,126 A * | 5/1977 | Wilson | ............... | B60T 15/18 303/33 |
| 4,076,322 A * | 2/1978 | Banker | ............... | B60T 13/665 303/1 |
| 4,125,294 A * | 11/1978 | Cannon | ............... | B60T 15/24 303/37 |
| 4,143,924 A * | 3/1979 | Coupland | ............. | B60T 8/1818 188/195 |
| 4,161,340 A * | 7/1979 | Hart | ............... | B60T 15/42 303/33 |
| 4,339,155 A * | 7/1982 | Hart | ............... | B60T 13/40 303/33 |
| 4,474,412 A * | 10/1984 | Schmitt | ............... | B60T 15/18 303/33 |
| 4,558,907 A * | 12/1985 | Reiss | ............... | B60T 15/22 303/36 |
| 4,671,576 A * | 6/1987 | Fourie | ............... | B60T 8/1705 188/156 |
| 5,083,843 A * | 1/1992 | Engle | ............... | B60T 15/54 303/36 |
| 5,192,118 A * | 3/1993 | Balukin | ............... | B60T 15/14 303/15 |
| 5,222,788 A * | 6/1993 | Dimsa | ............... | B60T 13/665 303/15 |
| 5,429,426 A * | 7/1995 | Hart | ............... | B60T 13/406 303/33 |
| 5,564,794 A * | 10/1996 | Hart | ............... | B60T 13/665 303/15 |
| 5,941,280 A * | 8/1999 | Hart | ............... | B60T 13/665 137/605 |
| 6,609,769 B2 * | 8/2003 | Hart | ............... | B60T 17/04 303/36 |
| 7,240,970 B2 * | 7/2007 | Reynolds | ............. | B60T 13/665 303/7 |
| 9,527,491 B2 * | 12/2016 | Wright | ............... | B60T 15/021 |
| 2002/0038976 A1 | 4/2002 | Hart et al. | | |
| 2002/0163248 A1 * | 11/2002 | Wood | ............... | B60T 8/1881 303/128 |
| 2003/0205927 A1 | 11/2003 | Kettle, Jr. | | |
| 2014/0102557 A1 | 4/2014 | Call et al. | | |
| 2014/0102558 A1 * | 4/2014 | Call | ............... | B60T 17/04 137/505 |
| 2014/0125115 A1 | 5/2014 | Gaughan et al. | | |
| 2015/0061360 A1 * | 3/2015 | Vaughn | ............... | B60T 17/04 303/36 |
| 2016/0046273 A1 * | 2/2016 | Wright | ............... | B60T 15/021 303/69 |
| 2016/0272185 A1 * | 9/2016 | Gaughan | ............... | B60T 15/54 |
| 2017/0253226 A1 * | 9/2017 | Gaughan | ............... | B60T 13/665 |

* cited by examiner

BRAKE CYLINDER MAINTAINING VALVE

CROSS REFERENCE TO RELATED APPLICATIONS

This application claims priority to U.S. Provisional Application No. 62/304,595 filed on Mar. 7, 2016, the disclosure of which is hereby incorporated in its entirety by reference.

BACKGROUND OF THE INVENTION

Field of the Invention

The present invention generally relates to brake apparatus for railway vehicles and, more particularly, to a valve for maintaining brake cylinder pressure for all service brake applications.

Description of Related Art

Railroad freight cars have a brake pipe that runs through each car and is coupled therebetween so as to extend continuously the length of the train. The brake pipe is charged with compressed air typically at the head end by a compressor on the locomotive. The compressed air not only provides the pneumatic brake force at the respective cars, but also serves as a communication link via which the car's brakes are controlled from the locomotive by increasing and decreasing the brake pipe pressure. Brake equipment for railroad freight cars utilizes control valves to control the operation of the brake cylinders and brakes for the freight cars, such as the ABDX control valve sold and manufactured by Wabtec Corporation.

When a train brake pipe is fully charged to the pressure setting of the locomotive brake valve device, a natural pressure gradient typically exists in the brake pipe due to leakage caused by wear and other issues resulting in pressure changes with the brake cylinders. Assuming the locomotive brake valve is set to charge the brake pipe to 90 psi, the pressure at each car from front to rear of the train will experience a slightly lower pressure due to leakage and fluid flow resistance as the pressure maintaining brake valve attempts to maintain the leakage. The brake pipe pressure will gradually rise from front to back in seeking the natural pressure gradient consistent with the application of brake pipe pressure at the locomotive.

Current brake systems for railway vehicles may also experience leakage of pressurized fluid into or out of the brake cylinder of the brake system. The Association of American Railroads' specification for a single railway car specifies allowable leakage into/out of the brake cylinder at the rate of +/−1-psi/min. At this rate, acceptable loss of brake cylinder pressure is permitted while still safely maintaining brake cylinder pressure levels for the operation of the railway vehicle's brake system. When operating a railway vehicle on a grade for an extended period of time, however, a minimal level of leakage into the brake cylinder in one minute can increase to a high enough pressure to cause excessive heat to be generated by the excessive pressure. This excessive pressure results in higher than desired shoe force creating a "hot wheel" condition in which forces within the brake cylinder cause the brake cylinder and the wheels of the railway vehicle to experience excessive heat. By venting pressure from the brake cylinder, this "hot wheel" condition is avoided.

SUMMARY OF THE INVENTION

In one embodiment, a brake cylinder maintaining system includes a main valve comprising a first diaphragm, a second diaphragm, and a valve member, with the first diaphragm having a reference pressure on one side of the first diaphragm and a brake cylinder pressure on an opposite side of the first diaphragm. The second diaphragm having a brake cylinder pressure on one side of the second diaphragm and the first diaphragm configured to move between a first position and a second position based on a differential between the reference pressure and the brake cylinder pressure. The second diaphragm configured to move between a first position and a second position when the brake cylinder pressure is greater than a predetermined value. The valve member configured to place a brake cylinder in fluid communication with a brake pipe when the first and second diaphragms are each in the second position and configured to isolate a brake cylinder from a brake pipe when the first diaphragm or the second diaphragm are in the first position. The system further includes a brake cylinder feed choke in fluid communication with the first and second diaphragms, with the brake cylinder feed choke configured to limit flow of brake cylinder pressure to the main valve during initial development of a brake application.

The system may further include a reference volume configured to receive the reference pressure and a reference volume valve configured to capture a target brake cylinder pressure within the reference volume. The predetermined value may be about 12 psi. The system may include a reference volume exhaust valve configured to place the reference volume in fluid communication with the exhaust after release of a brake application. The reference volume exhaust valve may be a diaphragm check valve including the brake cylinder pressure on one side and the reference pressure on an opposite side of the reference volume exhaust valve, with the reference volume exhaust valve configured to become unseated to connect the reference volume with exhaust when pressure of the reference volume is greater than pressure of the brake cylinder. The reference volume valve may be a check valve including the reference volume on one side and the brake cylinder pressure on an opposite side of the reference volume valve via the brake cylinder feed choke, with the reference volume valve configured to charge the reference volume with the target brake cylinder pressure during initial brake cylinder development.

The first diaphragm may be biased toward the first position via a spring. The second diaphragm is biased to the first position via a reset spring, wherein the reset spring at least partially determines the predetermined value. The main valve may include a cylinder maintaining output passage and a brake pipe passage, with the cylinder maintaining output passage in fluid communication with the brake pipe passage when the first and second diaphragms are each in the second position. The cylinder maintaining output passage is isolated from the brake pipe passage when the first diaphragm or the second diaphragm is in the first position. The system may further include a retaining valve in fluid communication with a brake cylinder passage and the cylinder maintaining output passage, with the retaining valve configured to prevent flow from the brake cylinder passage to the cylinder maintaining output passage.

In a further aspect, a brake cylinder maintaining system includes a hot wheel protection valve arrangement comprising a valve member configured to connect a brake cylinder to exhaust when a pressure of the brake cylinder exceeds a target pressure, and a brake cylinder maintaining arrangement comprising a main valve including a first diaphragm, a second diaphragm, and a valve member. The first diaphragm has a reference pressure on one side of the first diaphragm and a brake cylinder pressure on an opposite side of the first diaphragm, with the second diaphragm having a brake cylinder pressure on one side of the second diaphragm. The first diaphragm is configured to move between a first position and a second position based on a differential between the reference pressure and the brake cylinder pressure, with the second diaphragm configured to move between a first position and a second position when the brake cylinder pressure is greater than a predetermined value. The valve member is configured to place a brake cylinder in fluid communication with a brake pipe when the first and second diaphragms are each in the second position and configured to isolate a brake cylinder from a brake pipe when the first diaphragm or the second diaphragm are in the first position.

The brake cylinder maintaining arrangement may further include a brake cylinder feed choke in fluid communication with the first and second diaphragms, with the brake cylinder feed choke configured to limit flow of brake cylinder pressure to the main valve during initial development of a brake application.

DETAILED DESCRIPTION

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 1:
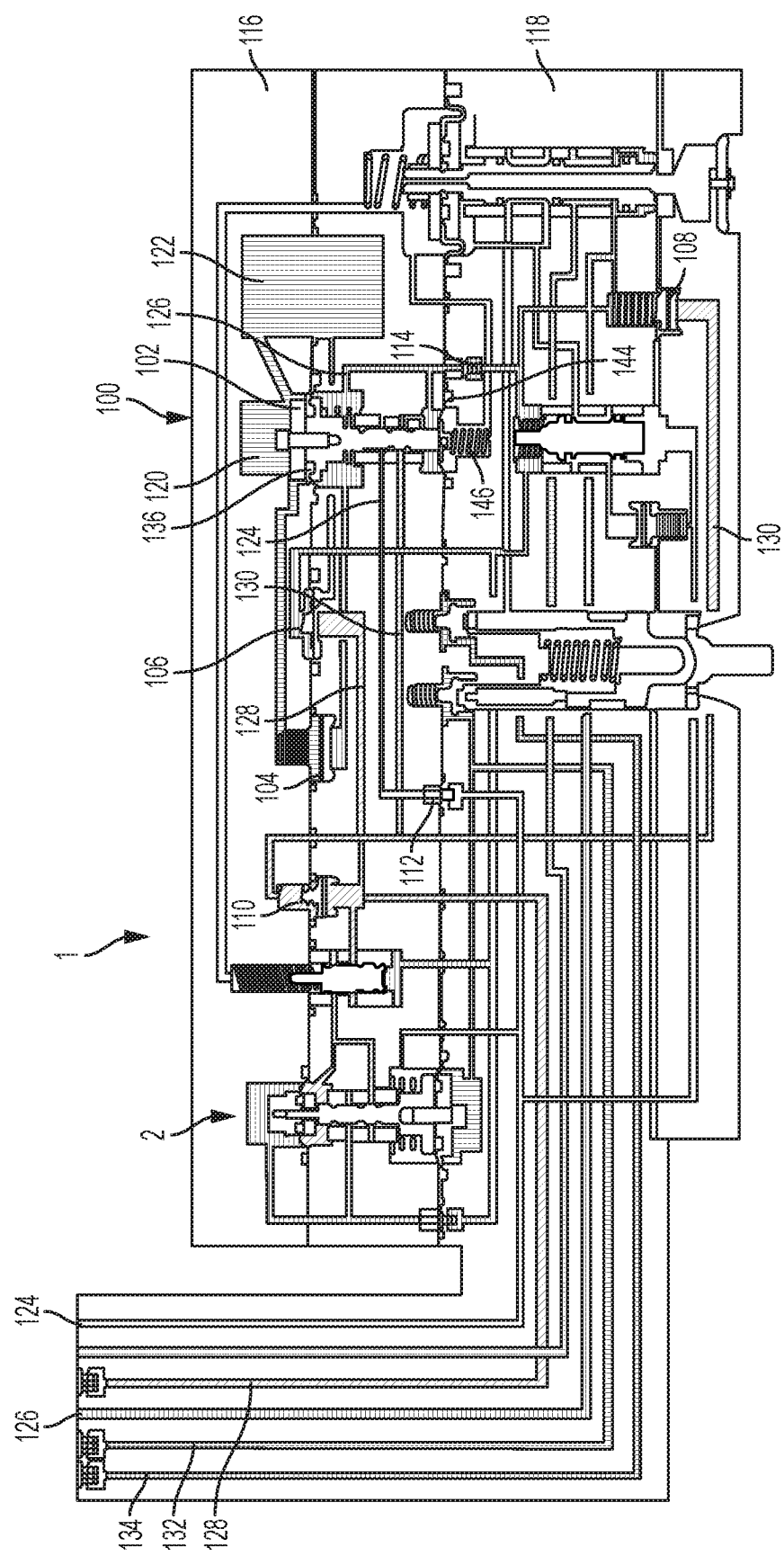
FIG. 1 is a schematic view of a system for maintaining brake cylinder pressure according to one embodiment of the present invention.

Referring to FIG. 1, according to one aspect of the present invention, a system for maintaining brake cylinder pressure 1 includes a hot wheel protection control valve arrangement 2 and a cylinder maintaining arrangement 100. The system 1 is generally provided for use with a railway vehicle to vent excess pressurized fluid that may leak into the brake cylinder of the railway vehicle, which is provided by the hot wheel protection control valve arrangement 2, and to maintain a pressure within a brake cylinder during a brake application, which is provided by the cylinder maintaining arrangement 100.

As will be discussed in more detail below, the system 1 utilizes air from the brake pipe to mitigate leakage out of a brake cylinder. Brake pipe pressure in a train is maintained via the locomotive equipment and is capable of generally providing an inexhaustible supply of air to those cars with leakage out of brake cylinder. However, the cylinder maintaining demand on brake pipe pressure in a train can result in some undesired consequences if specific safeguards are not incorporated into the brake cylinder maintaining system.

There are two types of demand on brake pipe pressure: continuous and temporary. Continuous leakage exists in the train line regardless of release or applied status of the brake cylinder. Temporary demand occurs on the brake pipe during a brake application with control valves applying temporary demand on the brake pipe to augment the service brake application signal transmission. Continuous demand on brake pipe creates a continuous flow into the train brake system to maintain brake pipe pressure. Continuous demand results in a pressure gradient from the front to the rear of a train. Temporary demand on brake pipe allows the manipulation of brake pipe at each car to develop cylinder pressure in a timely fashion. Typical freight control valves incorporate three distinct manipulations of brake pipe pressure, which are temporary. Temporary demands on brake pipe include: Preliminary Quick Service; Quick Service Limiting Valve (QSLV); and Accelerated Application Valve (AAV).

Preliminary Quick Service directs brake pipe pressure to a volume (quick service bulb) and is vented to atmosphere at the beginning of a brake application. This connection provides a local drop of brake pipe at each car to enhance the transmission of the brake pipe pressure reduction through the train. The Preliminary Quick Service isolates the brake pipe connection when the service piston moves into the service application position thereby directing auxiliary reservoir to brake cylinder. This demand on brake pipe is temporary.

The QSLV directs brake pipe pressure to brake cylinder when a brake application is made. When a brake application is made, the main piston directs auxiliary reservoir to brake cylinder and the QSLV directs brake pipe to cylinder. When brake cylinder reaches approximately 10 psi, the QSLV isolates brake pipe from brake cylinder. This demand on brake pipe is temporary. The QSLV, by FRA and AAR regulations, must produce 8 to 12-psi brake cylinder pressure for a 5-psi brake pipe reduction. Maintaining brake cylinder pressure with brake pipe cannot interfere with the function of the QSLV.

The AAV directs brake pipe pressure to exhaust locally at each car during a brake application. The AAV is tuned to initiate the local venting of brake pipe pressure at the beginning of a brake application and to discontinue venting as the pressure reduction rate decreases at the end of the application. This demand on brake pipe is temporary.

The control of any brake application stems from the ability of the locomotive brake system to not only initiate the venting of brake pipe pressure to signal the cars the apply the brakes, but to also control the amount of pressure reduction based on the engineers' movement of the brake valve handle. An equalizing reservoir pressure is controlled by the position of the engineers' brake valve handle. The locomotive brake system controls the level of reduction in brake pipe pressure by venting brake pipe to exhaust if the pressure is above the target equalizing reservoir. The locomotive brake system will also direct main reservoir pressure to brake pipe if the brake pipe pressure falls below the target equalizing reservoir pressure. The locomotive brake system vents brake pipe pressure rapidly at the beginning of an application. As the brake pipe pressure decreases within 2-psi of the equalizing reservoir pressure, the rate of brake pipe pressure decreases. The rate of brake pipe exhaust continuously slows down until the desired pressure reduction is achieved.

The functional parameters of the control valve brake pipe pressure manipulations have been designed, or "tuned", to maximize the performance. The "tuned" brake pipe manipulation refers to the functional parameters that control each of the current temporary demands on brake pipe. The Preliminary Quick Service creates a controlled local brake pipe pressure drop at the beginning of an application. The QSLV disconnects brake pipe from the brake cylinder when cylinder pressure increases to 8 to 12-psi. The AAV ceases the vent of brake pipe as the rate of brake pipe reduction slows at the end of the application.

If any of these control valve manipulations go beyond the design parameters, i.e., to extend the temporary demand on brake pipe pressure, the ability of the locomotive brake system to control the pressure reduction could be compromised. Any addition to the demand on brake pipe could result in a deeper pressure drop at the rear of a train. The locomotive brake system will eventually resupply the brake pipe pressure, increasing the pressure at the rear of the train to the target reduction. This could result in an undesired release of a brake application. Accordingly, a system for maintaining brake cylinder pressure must be designed to avoid adding additional demand on brake pipe pressure to avoid an undesired release.

Referring initially to FIGS. 1-4, an aspect of a hot wheel protection control valve 2 for a railway vehicle is shown. The hot wheel protection control valve 2, as described herein, is intended for use in a brake system of a railway car, as will be readily apparent to those skilled in the rail vehicle art. In particular, hot wheel protection control valve 2 may be provided in a service portion of a railway brake arrangement. The hot wheel protection control valve 2 may be adapted for use in railway vehicles used for passenger and/or cargo transit. However, this use is intended to be non-limiting and the hot wheel protection control valve 2 has applications in railway cars generally. Hot wheel protection control valve 2 in the depicted aspect includes an upper main body 4, a central main body 6, and a lower main body 8. In one aspect, upper main body 4, central main body 6, and lower main body 8 may be connected together using fasteners to form hot wheel protection control valve 2. In another aspect, upper main body 4, central main body 6, and lower main body 8 may be formed as a monolithic structure. Hot wheel protection control valve 2 may include, among other components, a cut-off valve 12 and a hot wheel protection valve 14. Additional components may be included along with the hot wheel protection control valve 2, including the cylinder maintaining arrangement 100, a manual release shuttle and check valve, and/or an automated release spool. The central main body 6 may define a cavity to receive cut-off valve 12 and a cavity to receive hot wheel protection valve 14.

Figure 2:
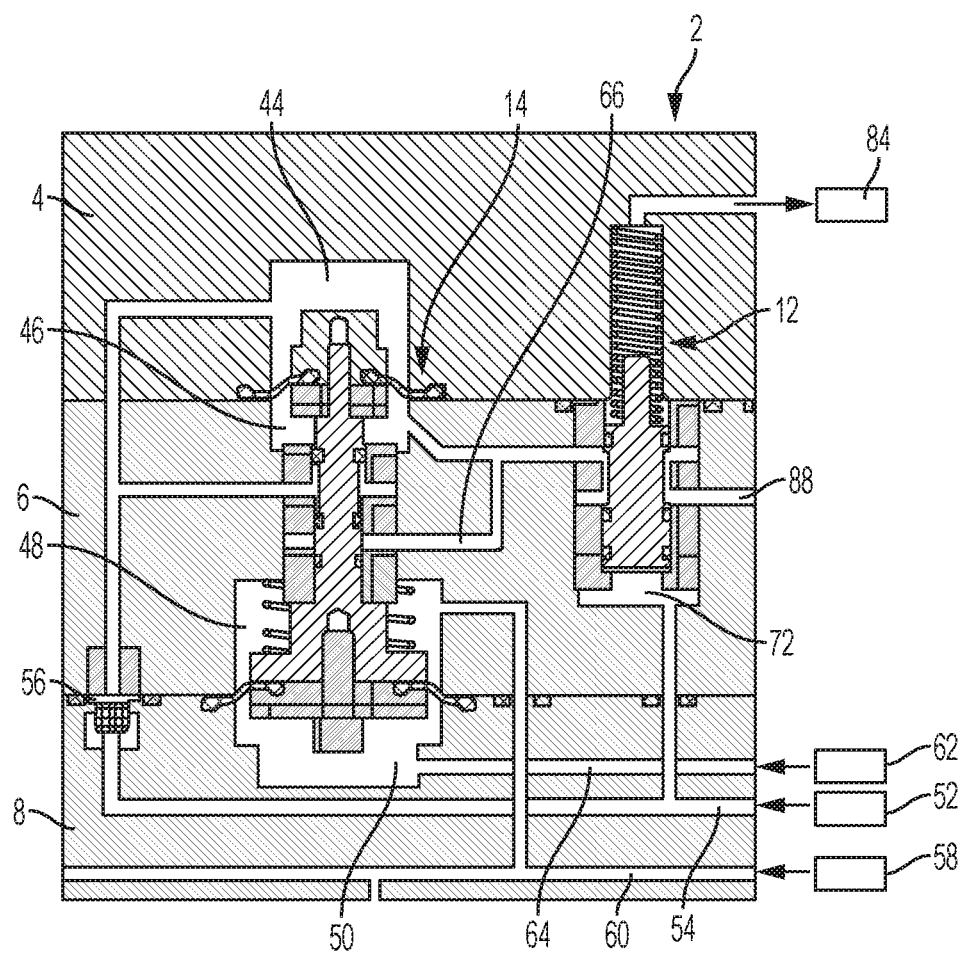
FIG. 2 is a schematic view of a cut-off valve and hot wheel protection valve arrangement of FIG. 1.
Figure 3:
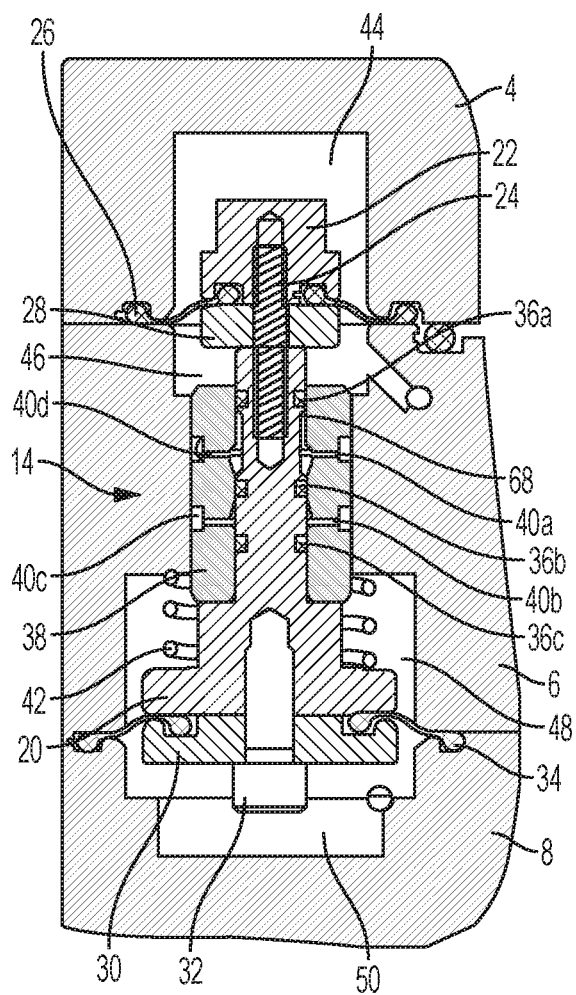
FIG. 3 is a cross-sectional view of the hot wheel protection valve arrangement of FIG. 1.
Figure 4:
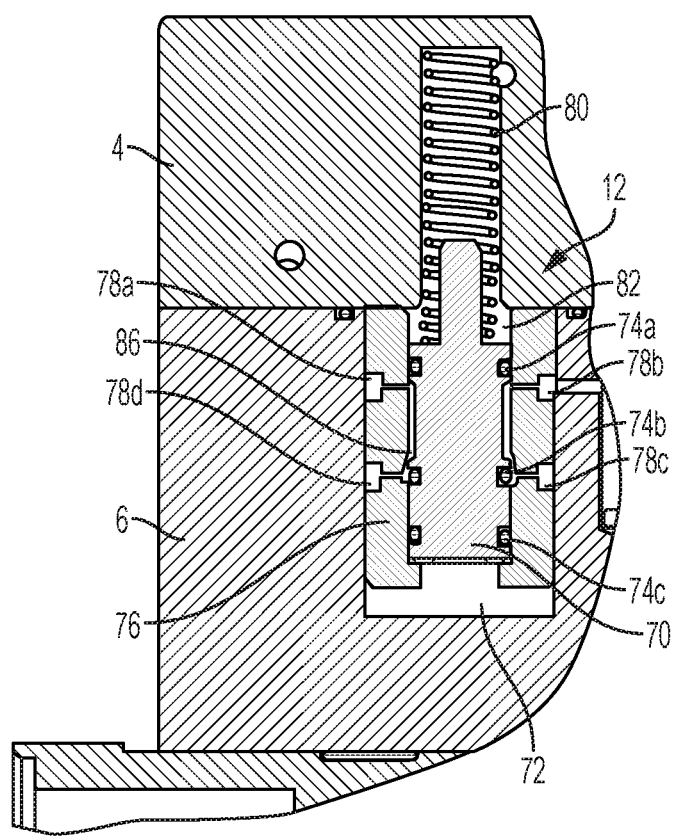
FIG. 4 is a cross-sectional view of the cut-off valve arrangement of FIG. 1.

Referring to FIGS. 2-4, hot wheel protection valve 14 may include several components used for exhausting pressurized fluid from a brake cylinder of a railway vehicle. Hot wheel protection valve 14, as described herein, is intended for use in a brake system of a railway car, as will be readily apparent to those skilled in the rail vehicle art. Hot wheel protection valve 14 is adapted for use in railway vehicles used for passenger and/or cargo transit. However, this use is intended to be non-limiting and hot wheel protection valve 14 has applications in railway cars generally.

Referring to FIG. 3, hot wheel protection valve 14 may include piston 20 connected to a feedback follower 22 using a threaded rod 24. An upper portion of piston 20 and feedback follower 22 may each define a threaded cavity that is threadedly connected to a portion of threaded rod 24. A feedback diaphragm 26 and a spacer 28 may also be provided on threaded rod 24 and positioned between the upper portion of piston 20 and feedback follower 22. In one aspect, feedback diaphragm 26 may be a flexible member that is configured to flex or stretch upwardly or downwardly upon movement of piston 20 in an upward or downward direction within hot wheel protection control valve 2. In one aspect, an outer circumferential surface of feedback diaphragm 26 may be positioned between upper main body 4 and central main body 6 of hot wheel protection control valve 2 so that feedback diaphragm 26 is "sandwiched" therebetween, and an inner circumferential surface of feedback diaphragm 26 may be "sandwiched" between feedback follower 22 and spacer 28.

A bottom portion of piston 20 may be connected to a follower 30 via a fastener 32. Fastener 32 may be inserted through follower 30 and threaded into a cavity defined in the bottom portion of piston 20. Another diaphragm 34 may be positioned between the bottom portion of piston 20 and follower 30. In one aspect, diaphragm 34 may be a flexible member that is configured to flex or stretch upwardly or downwardly upon movement of piston 20 in an upward or downward direction within hot wheel protection control valve 2. In one aspect, an outer circumferential surface of diaphragm 34 may be positioned between central main body 6 and lower main body 8 of hot wheel protection control valve 2 so that diaphragm 34 is "sandwiched" therebetween, and an inner circumferential surface of diaphragm 34 may be "sandwiched" between piston 20 and follower 30.

In one aspect, piston 20 may be T-shaped. An upper portion of piston 20 may have a reduced diameter compared to a lower portion of piston 20. The upper portion of piston 20 may define a plurality of circumferential grooves in an outer surface of piston 20. The grooves may be provided at different longitudinal positions along the upper portion of piston 20. A plurality of O-rings 36a, 36b, 36c may be positioned within the grooves defined in piston 20. O-rings 36a, 36b, 36c are provided to prevent leakage of pressurized fluid from hot wheel protection valve 14. Although three grooves and three O-rings are shown in connection with piston 20, it is to be understood that more or less grooves and/or O-rings may be provided to create a tighter seal between piston 20 and a bushing 38 provided around the upper portion of piston 20.

Bushing 38 may be cylindrical in shape to fit around the upper portion of piston 20. Bushing 38 may be slidable in conjunction with piston 20. A plurality of bushing passageways 40a, 40b, 40c, 40d may be defined in bushing 38. Bushing passageways 40a, 40b, 40c, 40d may permit pressurized fluid to pass through bushing 38 and thereby out of hot wheel protection valve 14, as will be described in detail below. Although four bushing passageways 40a, 40b, 40c, 40d are shown in connection with bushing 38, it is to be understood that more or less bushing passageways may be provided to more efficiently allow pressurized fluid to pass through bushing 38. The bushing 38 may rest on a portion of piston 20. A biasing member 42 may also be positioned around piston 20. A lower end of biasing member 42 may rest on a portion of piston 20, and an upper end of biasing member 42 may rest against a portion of central main body 6. In one aspect, biasing member 42 may be a spring. However, it is to be understood that alternative biasing members may be used that provide a resilient member that may be compressed and expanded to provide a biasing force. Biasing member 42 may be configured to assert a biasing force against piston 20 and diaphragm 34 during operation of hot wheel protection valve 14. It is also contemplated that biasing member 42 may not be used with hot wheel protection control valve 2.

With reference to FIG. 3, a plurality of chambers may be established by hot wheel protection valve 14 within hot wheel protection control valve 2. A first chamber 44 may be established above feedback diaphragm 26. A second chamber 46 may be established between feedback diaphragm 26 and bushing 38. A third chamber 48 may be established between the portion of central main body 6 upon which biasing member 42 rests and diaphragm 34. A fourth chamber 50 may be established below diaphragm 34. Chambers 44-50 are configured to receive pressurized fluid from different parts of hot wheel protection control valve 2, which will be described below.

In one aspect, shown in FIGS. 2 and 3, a brake cylinder 52 may be in fluid communication with first chamber 44 of hot wheel protection control valve 2 via a brake cylinder line 54. Through brake cylinder line 54, brake cylinder 52 may supply pressurized fluid to first chamber 44. A choke 56 may also be provided in brake cylinder line 54 to regulate the flow of pressurized fluid through brake cylinder line 54. Choke 56 may be positioned between brake cylinder 52 and first chamber 44. Brake cylinder line 54 may also be in fluid communication with bushing 38 and, in particular, bushing passageways 40a, 40b, 40c, 40d. As will be described in greater detail below, pressurized fluid from brake cylinder 52 may be exhausted through bushing passageways 40a, 40b, 40c, 40d to reduce the volume of pressurized fluid in brake cylinder 52. A brake pipe 58 may be in fluid communication with third chamber 48 of hot wheel protection valve 14 via a brake pipe line 60. It is also contemplated that an auxiliary reservoir (not shown) may be in fluid communication with third chamber 48, instead of brake pipe 58. An emergency reservoir 62 may be in fluid communication with fourth chamber 50 of hot wheel protection valve 14 via an emergency reservoir line 64. A hot wheel exhaust line 66 may be in fluid communication with bushing passageways 40a, 40b, 40c, 40d, cut-off valve 12, and second chamber 46. Details regarding cut-off valve 12 and its operation are provided below.

A method of using a hot wheel protection valve 14 to exhaust brake cylinder 52 pressure from a brake system of a railway vehicle is described below. As previously discussed, by using hot wheel protection valve 14, any excess pressurized fluid that leaks into the brake cylinder 52 of the railway vehicle may be exhausted from the brake system, thereby avoiding a hot wheel situation for the railway vehicle.

With reference to FIGS. 2 and 3, during use of hot wheel protection valve 14, biasing member 42 may apply a predetermined downward force on piston 20. The predetermined downward force may be provided based on the stiffness and resiliency of biasing member 42. The downward force exerted by biasing member 42 on piston 20 in turn provides a downward force on diaphragm 34. It is also contemplated that pressurized fluid in first chamber 44 from brake cylinder 52 may assert a downward force on feedback diaphragm 26 and thereby piston 20. Pressurized fluid in third chamber 48 from brake pipe 58 (or, alternatively, an auxiliary reservoir) may also provide a downward force on diaphragm 34 and thereby piston 20, which is connected to diaphragm 34. Pressurized fluid in fourth chamber 50 from emergency reservoir 62 may assert an upward force on diaphragm 34 and thereby piston 20. In this aspect, a pressure differential is developed between biasing member 42, brake pipe 58, and brake cylinder 52 on a first side of hot wheel protection valve 14, and emergency reservoir 62 on a second opposing side of hot wheel protection valve 14. Hot wheel protection valve 14 is positioned in a lap position when the opposing forces on the pressure differential are substantially equal. In this situation, bushing passageway 40b, which leads to hot wheel exhaust line 66, is closed off by an outer surface of piston 20.

During operation of the railway vehicle, when brake cylinder 52 pressure is provided at a predetermined level, the hot wheel protection valve 14 remains in the lap position. In one aspect, when brake cylinder 52 pressure is less than 42 psi, hot wheel protection valve 14 is positioned in the lap position and does not vent excess pressurized fluid from hot wheel protection valve 14. However, during operation of the railway vehicle, pressurized fluid may slowly leak into brake cylinder 52, thereby bringing brake cylinder 52 pressure to an excessive pressure level. To avoid a hot wheel condition, this excessive pressure should be vented from brake cylinder 52. As the pressure increases in brake cylinder 52, the downward force from the pressurized fluid supplied to first chamber 44 is increased and unbalances the pressure differential in hot wheel protection valve 14. Pressurized fluid in first chamber 44 pushes down on feedback diaphragm 26, which pushes piston 20 downwardly.

As piston 20 is moved downwardly, bushing passageway 40b is opened and fluid communication is established between brake cylinder line 54 and hot wheel exhaust line 66. A groove 68 on piston 20 allows for fluid communication from brake cylinder line 54 to hot wheel exhaust line 66. Groove 68 allows for fluid communication from brake cylinder line 54, through bushing passageway 40d, through groove 68, through bushing passageway 40b, and through hot wheel exhaust line 66. This fluid communication allows pressurized fluid from brake cylinder line 54 to vent through bushing passageway 40b to exhaust through hot wheel exhaust line 66. As pressurized fluid is vented from brake cylinder 52, the downward pressure exerted on feedback diaphragm 26 and piston 20 by pressurized fluid in first chamber 44 is reduced accordingly. As the downward pressure exerted on piston 20 is reduced, the pressure differential is brought back to the lap position, wherein the downward pressure exerted by pressurized fluid in first chamber 44, third chamber 48, and biasing member 42 is substantially equal to the upward pressure applied by the pressurized fluid in fourth chamber 50. Hot wheel protection valve 14 may be configured to reach the lap position when brake cylinder 52 pressure ceases to increase and pressure on piston 20 is reduced. Hot wheel protection valve 14 may "meter", or continually vent, to match the leakage into brake cylinder 52 in order to prevent an increase above a predetermined pressure level in brake cylinder 52.

While hot wheel protection valve 14 will ensure that any pressurized fluid that leaks into brake cylinder 52 will be vented from hot wheel protection control valve 2 to maintain a desired brake cylinder 52 pressure level, it is also contemplated that there are situations during operation of the railway vehicle in which an operator intends to stop the railway vehicle and an excess pressure level in brake cylinder 52 is desired to apply a brake force to the railway vehicle. In this situation, the venting of brake cylinder 52 is no longer appropriate since any and all brake cylinder 52 pressure should be available to control or stop the railway vehicle. Cut-off valve 12 provides the ability to nullify the exhaust feature of hot wheel protection valve 14 to allow pressurized fluid to build up in brake cylinder 52. In one aspect, cut-off valve 12 prevents venting of hot wheel protection valve 14 when brake cylinder 52 pressure exceeds 42 psi. It is to be understood, however, that different brake cylinder 52 pressure levels which nullify the venting of hot wheel protection valve 14 are also contemplated.

Referring to FIGS. 2 and 4, cut-off valve 12 is shown and described. Cut-off valve 12 may be in fluid communication with hot wheel protection valve 14 via hot wheel exhaust line 66. Cut-off valve 12 may include a piston 70 positioned in a chamber 72 defined by central main body 6. A plurality of grooves may be defined in an outer surface of piston 70. An O-ring 74a, 74b, 74c may be positioned in each groove defined on piston 70. O-rings 74a, 74b, 74c are provided to prevent leakage of pressurized fluid from cut-off valve 12. Although three grooves and three O-rings are shown in connection with piston 70, it is to be understood that more or less grooves and/or O-rings may be provided to create a tighter seal between piston 70 and bushing 76 provided around the piston 70. Bushing 76 may be cylindrical in shape to fit around piston 70. Bushing 76 may be slidable in conjunction with piston 70. A plurality of bushing passageways 78a, 78b, 78c, 78d may be defined in bushing 76. Bushing passageways 78a, 78b, 78c, 78d may permit pressurized fluid to pass through bushing 76 and thereby out of hot wheel protection valve 14, through cut-off valve 12, and out of cut-off valve 12, as will be described in detail below. Although four bushing passageways 78a, 78b, 78c, 78d are shown in connection with bushing 76, it is to be understood that more or less bushing passageways may be provided to more efficiently allow pressurized fluid to pass through bushing 76. A biasing member 80 may be provided on an upper portion of piston 70. In one aspect, biasing member 80 may be a spring. However, it is to be understood that alternative biasing members may be used to provide a resilient member that may be compressed and expanded to provide a biasing force. Biasing member 80 may be configured to assert a biasing downward force against piston 70 during operation of cut-off valve 12. It is also contemplated that biasing member 80 may not be used with cut-off valve 12. Biasing member 80 may be positioned in a chamber 82 defined by upper main body 4.

As shown in FIG. 2, brake cylinder 52 may also be in fluid communication with chamber 2 and cut-off valve 12 via brake cylinder line 54. Pressurized fluid supplied to chamber 72 from brake cylinder 52 asserts an upward force on piston 70. Chamber 82 may be fluidly connected to atmosphere 84. A pressure differential is established between the force exerted by biasing member 80 and atmospheric pressure on one side of piston 70, and the force exerted by the pressurized fluid in chamber 72 from brake cylinder 52. When these pressures are substantially equal, the piston 70 is positioned in a lap position.

In one aspect, when cut-off valve 12 is positioned in a release position, and brake cylinder 52 pressure is approximately zero psi, biasing member 80 exerts enough force on piston 70 to permit venting of hot wheel protection valve 14. In this situation, however, since there is no brake cylinder 52 pressure, venting of brake cylinder 52 through hot wheel protection valve 14 is not needed. When brake cylinder 52 pressure is present and brake cylinder 52 pressure is greater than zero but less than a predetermined excess pressure level, the force exerted by the pressurized fluid in chamber 72 from brake cylinder 52 is insufficient to overcome the force exerted by biasing member 80. Therefore, cut-off valve 12 remains open and permits venting of pressurized fluid from hot wheel protection valve 14. As pressurized fluid is leaked into brake cylinder 52, and hot wheel protection valve 14 is used to vent the excess pressurized fluid, the vented pressurized fluid is directed through hot wheel exhaust line 66 into cut-off valve 12. The vented pressurized fluid is directed through bushing passageway 78a, through a groove 86 defined in the outer surface of piston 70, through bushing passageway 78c, and through a cut-off valve exhaust line 88. The vented pressurized fluid is vented out of the cut-off valve 12 through cut-off valve exhaust line 88 and is vented to atmosphere or, alternatively, another chamber, such as the retainer exhaust cavity, of hot wheel protection control valve 2.

In another aspect, when brake cylinder 52 pressure is present and excess pressurized fluid is supplied to brake cylinder 52, cut-off valve 12 may be activated to prevent the excess pressurized fluid from being vented from hot wheel protection valve 14. In one aspect, when the brake cylinder 52 pressure exceeds 42 psi, the cut-off valve 12 is activated.

Figure 8:
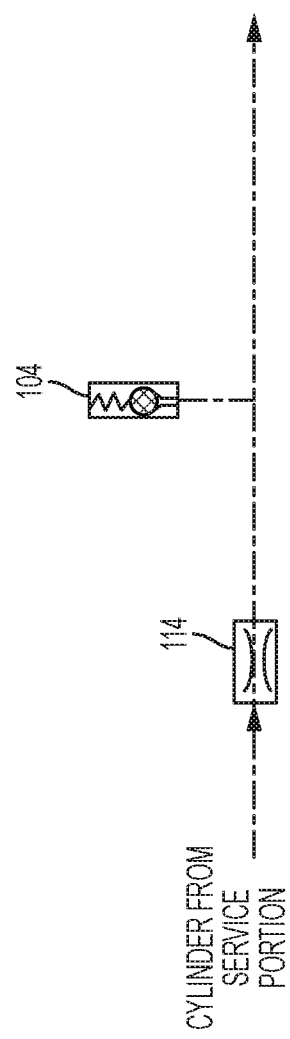
FIG. 8 is a schematic view of a cylinder maintaining charging choke and check valve arrangement of FIG. 1, showing an initial application position.

When the brake cylinder 52 is supplied with this excess pressurized fluid, the pressurized fluid is directed to chamber 72 of cut-off valve 12. The pressurized fluid in chamber 72 exerts an upward force on piston 70 that is greater than and overcomes the downward force exerted by the biasing member 80 on piston 70. In this situation, the piston 70 is moved upwards in cut-off valve 12, which closes bushing passageways 78a, 78c to prevent pressurized fluid vented from hot wheel protection valve 14 from being vented through cut-off valve exhaust line 88. Since bushing passageways 78a, 78c are closed to prevent venting through cut-off valve 12, any pressurized fluid vented from hot wheel protection valve 14 through hot wheel exhaust line 66 is directed to second chamber 46 of hot wheel protection valve 14 via hot wheel exhaust line 66, as shown in FIG. 8. Since no pressurized fluid is permitted to exhaust from hot wheel protection valve 14, substantially all of the pressurized fluid supplied to brake cylinder 52 can be used to apply the brakes on the railway vehicle. Choke 56 also assists in preventing the pressurized fluid from being vented through hot wheel protection valve 14 when an operator wants full brake cylinder 52 pressure to apply the brakes on the railway vehicle. Choke 56 regulates the flow of pressurized fluid into hot wheel protection valve 14 and ensures that a considerable amount of the pressurized fluid from brake cylinder 52 is directed to chamber 72 of cut-off valve 12 instead of hot wheel protection valve 14 to ensure that cut-off valve 12 nullifies the venting feature of hot wheel protection valve 14.

Referring to FIGS. 1 and 5-20, the cylinder maintaining arrangement 100 includes a main valve 102, a reference volume valve 104, a reference volume exhaust valve 106, first and second retaining valves 108, 110, a brake pipe feed choke 112, and a brake cylinder feed choke 114. The cylinder maintaining arrangement 100 is configured to sense a drop in brake cylinder pressure and direct brake pipe to the brake cylinder to prevent a decrease of the targeted pressure within the brake cylinder. Accordingly, the hot wheel protection control valve 2, discussed above and shown in FIGS. 1-4, and the cylinder maintaining arrangement 100 function together to maintain brake cylinder pressure with the hot wheel protection control valve 2 regulating leakage into the brake cylinder and the cylinder maintaining arrangement 100 regulating leakage out of the brake cylinder. As noted above, the system 1 may be incorporated into the service portion of a brake control valve and may include a cylinder maintaining portion 116 and a manual release valve portion 118. The system 1 includes a number of interconnected passages connected to different components of a railroad brake system. The system 1 includes a reference pressure passage 120 configured to be connected to a reference volume 122, a brake pipe passage 124 configured to be connected to a brake pipe, a brake cylinder passage 126 configured to be connected to a brake cylinder (not shown), a retainer exhaust passage 128, a cylinder maintaining output passage (CM out) 130, an emergency passage 132 configured to be connected to an emergency reservoir (not shown), and an auxiliary passage 134 configured to be connected to an auxiliary reservoir (not shown).

Referring to FIGS. 1, 6, and 10-12, the main valve 102 includes a first diaphragm 136 with a reference pressure (via the reference volume 122 and passage 120) on a one side of the diaphragm 136 and a brake cylinder pressure (via the brake cylinder passage 126) on the opposite side of the diaphragm 136. The first diaphragm 136 is biased toward the reference pressure via spring 138. The first diaphragm 136 is connected to a valve member 140, such as a main piston, having a O-rings 142 received within a port body to selectively connect or isolate the brake pipe passage 124 from the CM out passageway 130, as discussed below in more detail. The main valve 102 also includes a second diaphragm 144 and reset spring 146, which are configured to prevent the main valve 102 from directing brake pipe pressure to the brake cylinder until a brake cylinder pressure increases above a predetermined value, such as 12 psi. In particular, the second diaphragm 144 and reset spring 146 are configured to prevent undesired demand on the brake pipe during the QSLV function discussed above. The second diaphragm 144 has a brake cylinder pressure (via brake cylinder passage 126) on one side of the diaphragm 144 and atmosphere pressure on the opposite side of the diaphragm 144 with the reset spring 146 biasing the diaphragm toward the brake cylinder pressure. The first and second diaphragms 136, 144 each have a first position and a second position. When the first and second diaphragms 136, 144 are each in the first position, as shown in FIG. 6A, brake cylinder is isolated from brake pipe. When the first and second diaphragms 136, 144 are each in the second position (FIG. 6B), brake cylinder is in fluid communication with the brake pipe. The movement of the first diaphragm 136 between the first and second positions is determined by the differential between the reference pressure in the reference pressure volume 122 and the brake cylinder pressure. The movement of the second diaphragm 144 between the first and second position is generally determined by the differential of the brake cylinder pressure and the force provided by the reset spring 146.

Referring to FIGS. 1, 5, and 17-20, the reference volume valve 104 is a check valve, although other suitable valve structures may be utilized. The reference volume valve 104 has a brake cylinder pressure (via brake cylinder passage 126) on one side of the valve 104 and a reference pressure (via the reference passage 120 and reference volume 122) on the opposite side of the valve 104. The reference volume valve 104 is configured to charge the reference volume 122 with the target brake cylinder pressure during initial brake cylinder development, as discussed below in more detail. The reference volume valve 104 is moveable between a first position and a second position, which is determined by the differential between the reference pressure and the brake cylinder pressure.

Referring to FIGS. 1, 5, and 17-20, the reference volume exhaust valve 106 is a diaphragm check valve, although other suitable valve structures may be utilized. The reference volume exhaust valve 106 has brake cylinder pressure (via the brake cylinder passage 126) on one side of the valve 106 and a reference pressure (via the reference passage 120 and reference volume 122) on the opposite side of the valve 106. The reference volume exhaust valve 106 has a first position and a second position, which is generally determined by the differential between the brake cylinder pressure and the reference pressure. When the reference volume exhaust valve 106 moves from the first position, shown in FIG. 1, the valve 106 is unseated to connect the reference volume 122 to exhaust via the retainer exhaust passage 128.

Referring to FIGS. 1 and 13-16, the first and second retaining valves 108, 110 are check valves, although other suitable valve structures may be utilized. The first retaining valve 108 has a brake cylinder pressure (via brake cylinder passage 126) on one side of the valve 108 and a cylinder maintaining pressure (via CM out passage 130) on the opposite side of the valve 108. The second retaining valve 110 has a cylinder maintaining pressure (via the CM out passage 130) on one side of the valve 110 and retainer exhaust pressure (via the retainer exhaust passage 128) on the opposite side of the valve 110.

During operation of the cylinder maintaining arrangement 100, the target cylinder pressure is used as a reference to determine when the drop in the actual cylinder pressure should be maintained by directing brake pipe to the brake cylinder. This target cylinder pressure is determined by using the maximum pressure that is developed for a given brake pipe reduction regardless of piston travel of the brake cylinder. The maximum cylinder pressure developed is used as the reference pressure to determine when brake pipe should be directed to cylinder.

One problem with "sensing" the maximum cylinder pressure is the pressure developed internally in the control valve when the main service piston (not shown) moves to the applied position. During release, the auxiliary reservoir is typically at 90 psi and brake cylinder is at 0 psi. When the brake control valve moves to the applied position, the 90 psi auxiliary reservoir is directed to the 0 psi cylinder. The result in a short-lived "spike" in the cylinder pressure, which internally the cylinder pressure increases to above 25 psi. The "spike" would be incorrectly "sensed" as the target pressure to maintain. The resulting erroneous target pressure would create an undesired demand on brake pipe as well as developing greater than the required 8 to 12 psi cylinder pressure. One option could be to allow brake cylinder pressure to decrease significantly before allowing the brake pipe to be directed to the brake cylinder, such as 8-10 psi below the target pressure. However, the control of train speed during prolonged brake applications while negotiating a grade are typically achieved with a 6 to 10 psi brake reduction which develops 12 to 23 psi cylinder pressure. Thus, allowing cylinder pressure to drop 10 psi below the typical cylinder pressure developed on a car with no leakage would provide a minimal mitigation of leakage out of cylinder.

Figure 5:
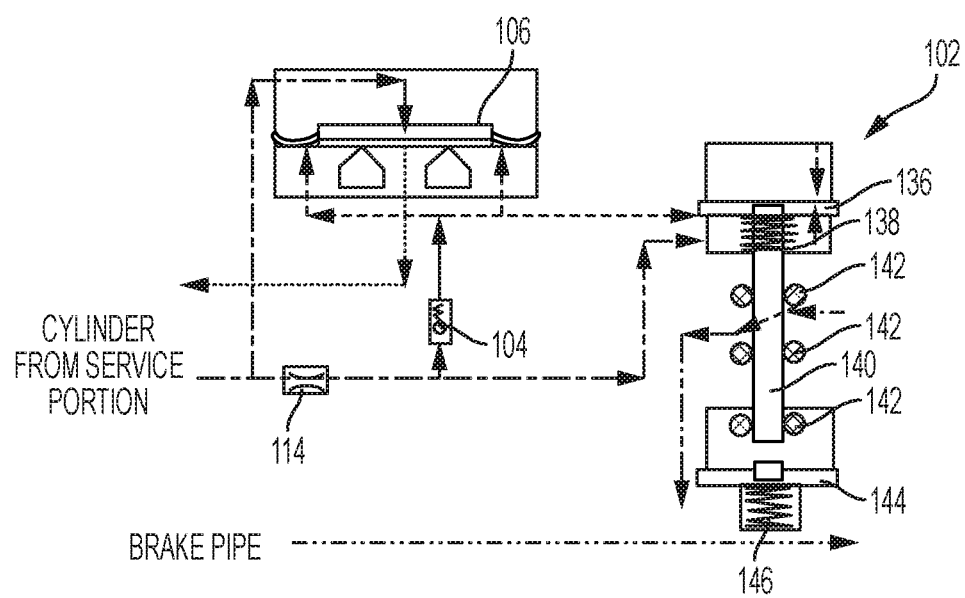
FIG. 5 is a schematic view of a cylinder maintaining valve arrangement of FIG. 1.

According to one aspect, with reference to FIG. 5, the cylinder maintaining arrangement 100 avoids the impact of the internal "spike" in brake cylinder pressure noted above by utilizing the brake cylinder feed choke 114. The brake cylinder feed choke 114 is configured to restrict the flow of air during the "spike" to the reference volume valve 104 and the second diaphragm 144. Thus, the brake cylinder feed choke 114 prevents an erroneously high target pressure from being directed to the reference volume 122 via the reference volume valve 104 and also to ensure the "spike" in pressure does not interfere with the function of the QSLV by overcoming the force of the reset spring 146 during such a "spike" in pressure. As discussed above, to avoid undesired demand from the cylinder maintaining arrangement 100 on the brake pipe during the QSLV function, the second diaphragm 144 and reset spring 146 function to keep the valve member 140 from directing brake pipe pressure to the brake cylinder until the brake cylinder pressure increases above a predetermined value, such as 12 psi. The cylinder maintaining arrangement 100 prevents any unwanted additional temporary demand on the brake pipe and only produces a continuous demand on brake pipe on a freight car with leakage out of the brake cylinder. Further, the protection against the internal "spike" in pressure and preventing actuation of the cylinder maintaining arrangement 100 until the brake cylinder pressure is greater than a predetermined value, such as 12 psi, allows the cylinder maintaining arrangement 100 to target about 2-3 psi below the maximum brake cylinder pressure developed for a given brake application.

During initial brake cylinder development, the brake cylinder pressure developed from the service portion makes a connection to the underside of the first diaphragm 136 of the main valve 102 through the brake cylinder feed choke 114. The brake cylinder pressure in the underside of the first diaphragm 136 fills the top side of the first diaphragm 136 and the reference volume 122 via the reference volume valve 104. The reference volume 122 will be approximately 1 psi lower than the brake cylinder pressure under the first diaphragm 136, although other suitable pressure differentials may be utilized. During the initial brake cylinder development, the second diaphragm 144 and reset spring 146 will, as discussed above, prevent the valve member 140 of the main valve 102 from actuating thereby allowing the QSLV and service portion to supply all of the brake cylinder pressure.

When leakage out of the brake cylinder exists, the pressure of the reference volume 122 remains constant on the top of the first diaphragm 136 while the brake cylinder pressure on the underside of the first diaphragm 136 is reduced. The force imbalance causes the valve member 140 to move downward as the middle O-ring 142 places the brake pipe in fluid communication with the brake cylinder through an undercut provided in the valve bushing. The amount of brake pipe pressure provided to the brake cylinder is controlled by the amount of brake cylinder leakage and the brake pipe feed choke 112. When the brake cylinder pressure is returned to within an acceptable tolerance of the original target pressure, the valve member 140 and the first diaphragm 136 will return to the first position where the O-rings 142 isolate the brake pipe from the brake cylinder. The cylinder maintaining pressure (via CM out passage 130) is directed to the first retaining valve 108 in the manual release portion 118. The first retaining valve 108 prevents brake cylinder air from feeding into the brake pipe (via CM out passage 130) in the event that brake pipe pressure becomes lower than brake cylinder pressure. The second retaining check valve 110 prevents the cylinder maintaining pressure (via CM out passage 130) from going to the retaining valve.

When the brake application is released, the service portion directs brake cylinder to retainer exhaust. Brake cylinder pressure in the service portion is restricted by a choke, such as Port 10 choke in a pipe bracket face, of the service portion. The choke causes a rapid increase of pressure within the service portion for a short time interval, which forces the reference volume exhaust valve 106 to lift from its seat to connect the reference volume 122 to exhaust. When the brake cylinder reaches approximately 12 psi or other predetermined value, the second diaphragm 144 and reset spring 146 moves in contact with the valve member 140 of the main valve 102 to force the valve member 140 back to its original position with the brake pipe being isolated from the brake cylinder.

Figure 6A:
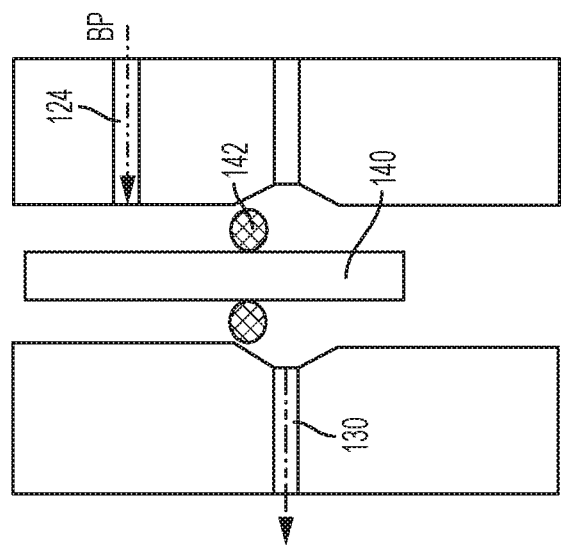
FIG. 6A is a schematic view of a bore arrangement of the cylinder maintaining valve arrangement of FIG. 1, showing a first position of the cylinder maintaining valve arrangement.
Figure 6B:
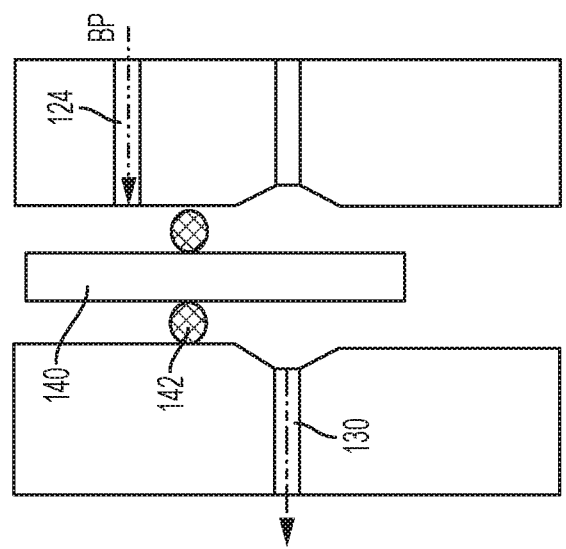
FIG. 6B is a schematic view of a bore arrangement of the cylinder maintaining valve arrangement of FIG. 1, showing a second position of the cylinder maintaining valve arrangement.

Referring to FIGS. 6A and 6B, the valve member 140 of the main valve 102 is shown in a first position (FIG. 6A), where the brake cylinder is released or applied with no leakage out of the brake cylinder, and a second position (FIG. 6B), where the brake cylinder is applied with leakage out of the cylinder. The O-ring 142 isolates the brake pipe passage 124 from the CM out passage 130 in the first position and moves into an undercut or larger diameter portion of the valve seat in the second position, to place the brake pipe passage 124 in fluid communication with the CM out passage 130. As discussed above, the CM out passage 130 is ultimately connected to brake cylinder via the first retaining valve 108.

Figure 7:
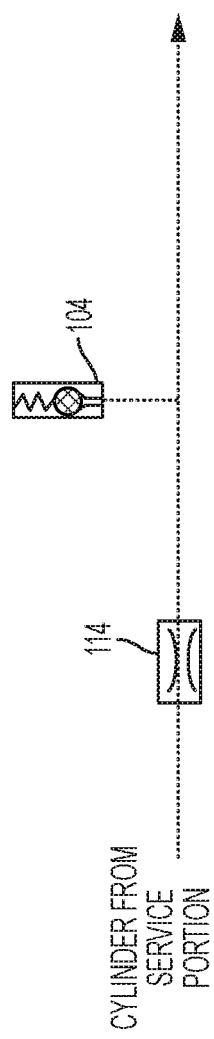
FIG. 7 is a schematic view of a cylinder maintaining charging choke and check valve arrangement of FIG. 1, showing a release position.
Figure 9:
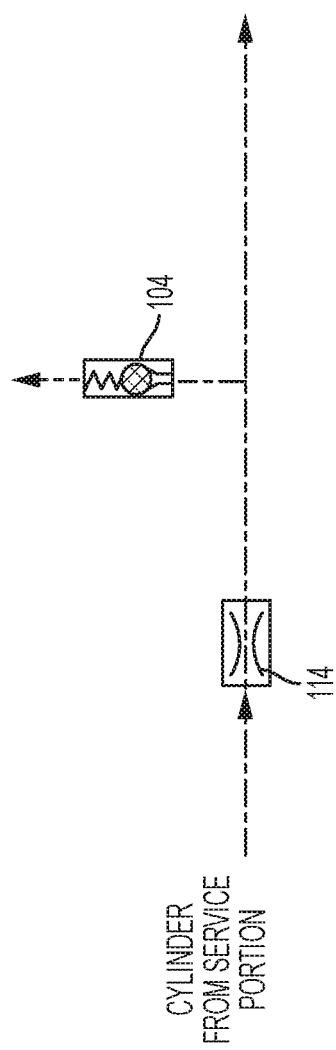
FIG. 9 is a schematic view of a cylinder maintaining charging choke and check valve arrangement of FIG. 1, showing an application position.

Referring to FIGS. 7-9, the relationship between the reference volume valve 104 and the brake cylinder feed choke 114 is shown. During an initial application, shown in FIG. 8, the auxiliary reservoir pressure is directed to brake cylinder with cylinder pressure from the service portion initial spiking to a value greater than 25 psi. The brake cylinder feed choke 114 restricts the flow to the underside of the first diaphragm 136 and the reference volume valve 104 to prevent an undesired connection of brake pipe to brake cylinder, as described above. During application and after the initial application, shown in FIG. 9, the brake cylinder pressure is equal on either side of the brake cylinder feed choke 114. The brake cylinder pressure is directed to the reference volume valve 104 with the reference volume 122 being charged to 1 psi (or other predetermined value) less than the brake cylinder pressure.

Figure 10:
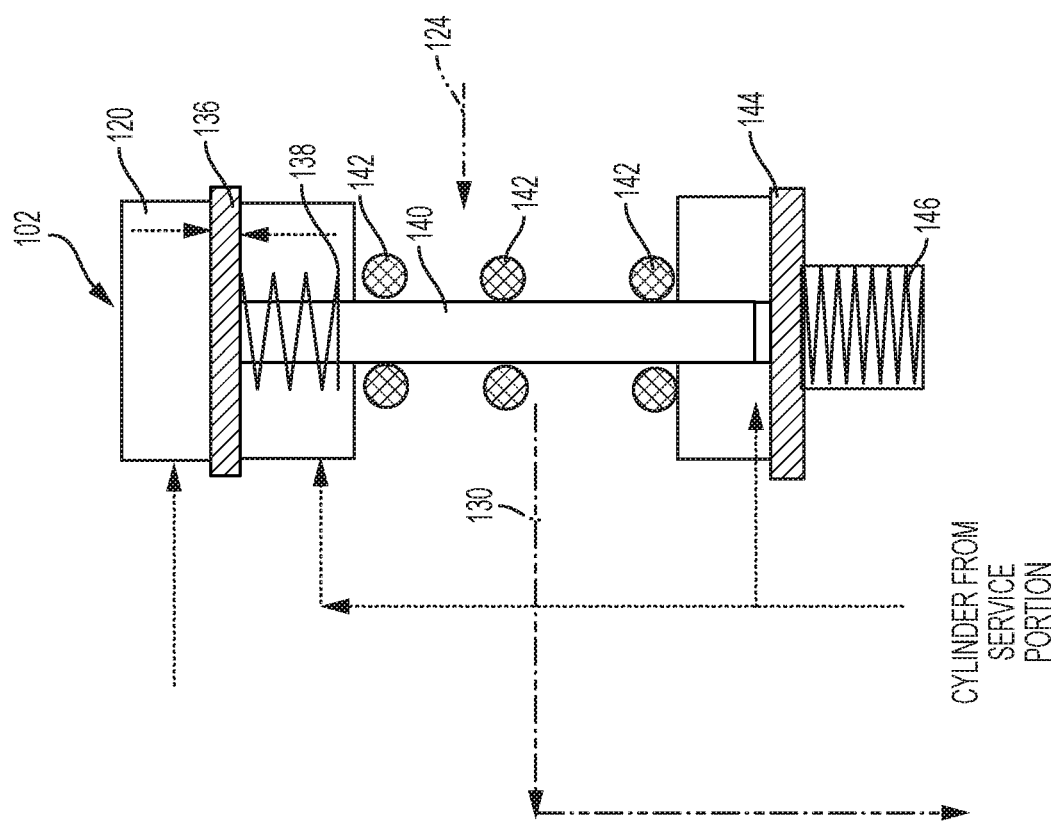
FIG. 10 is a schematic view of a main piston of the cylinder maintaining valve arrangement of FIG. 1, showing a release position.
Figure 11:
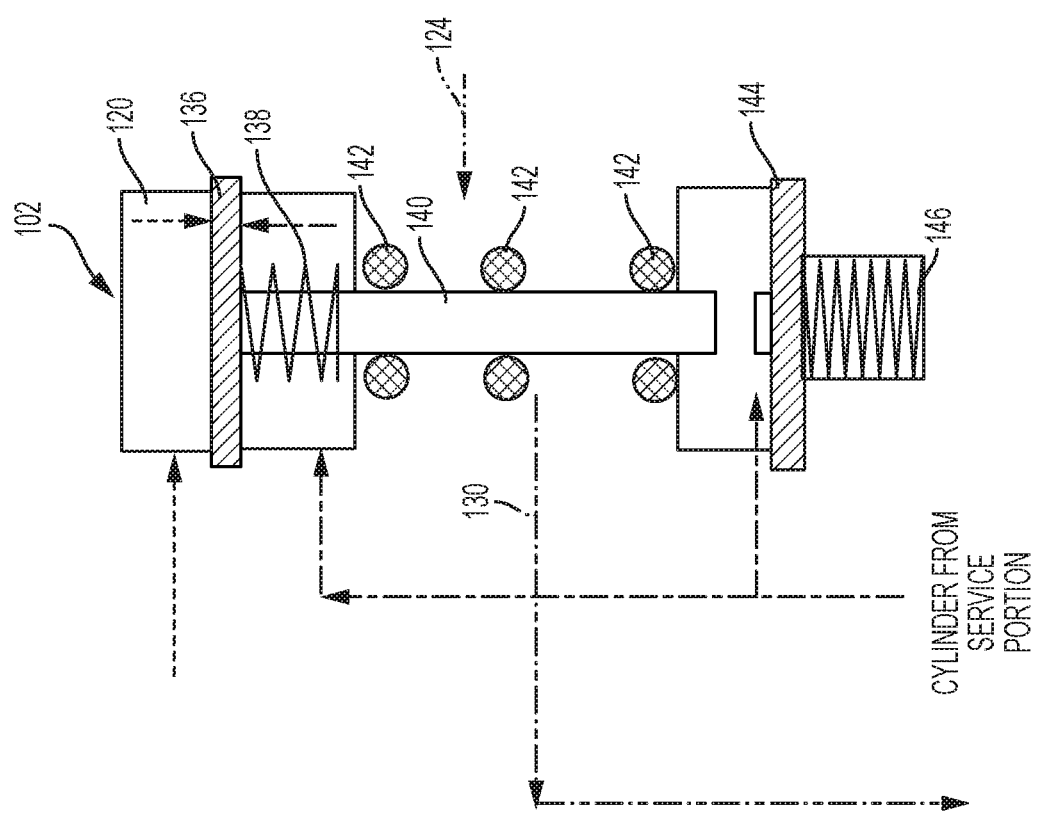
FIG. 11 is a schematic view of a main piston of the cylinder maintaining valve arrangement of FIG. 1, showing an application position with no brake cylinder leakage.
Figure 12:
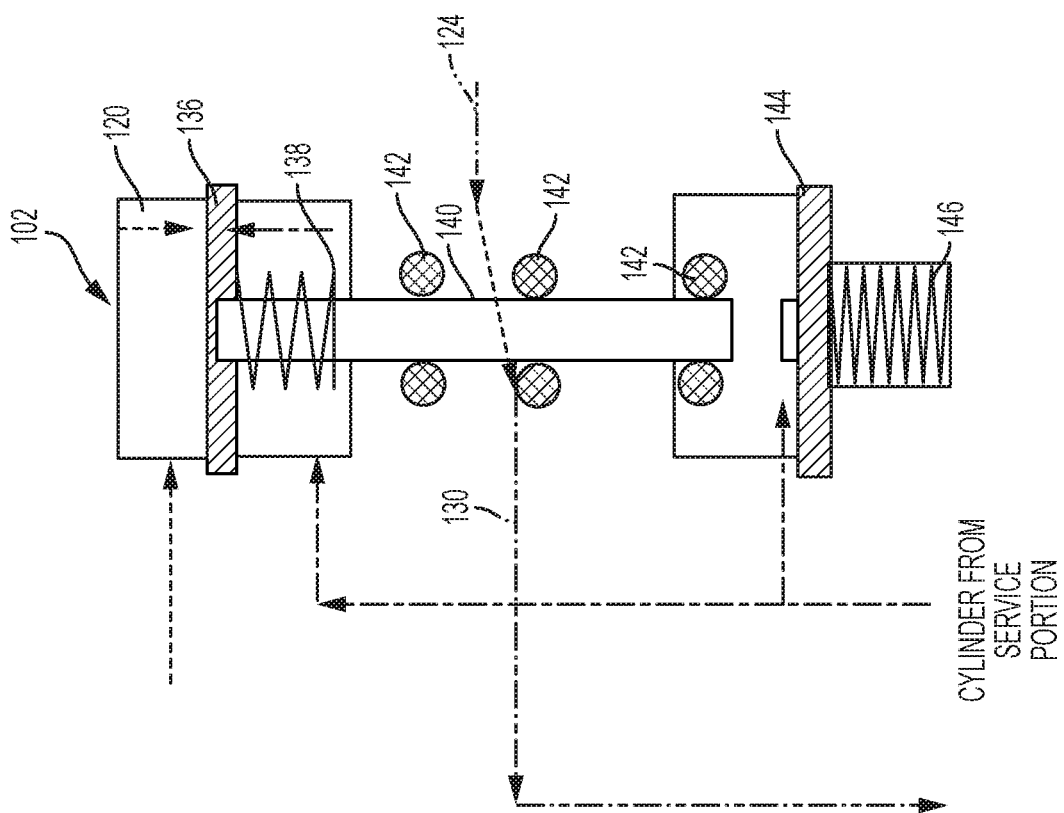
FIG. 12 is a schematic view of a main piston of the cylinder maintaining valve arrangement of FIG. 1, showing an application position with brake cylinder leakage.
Figures 13A, 13B:
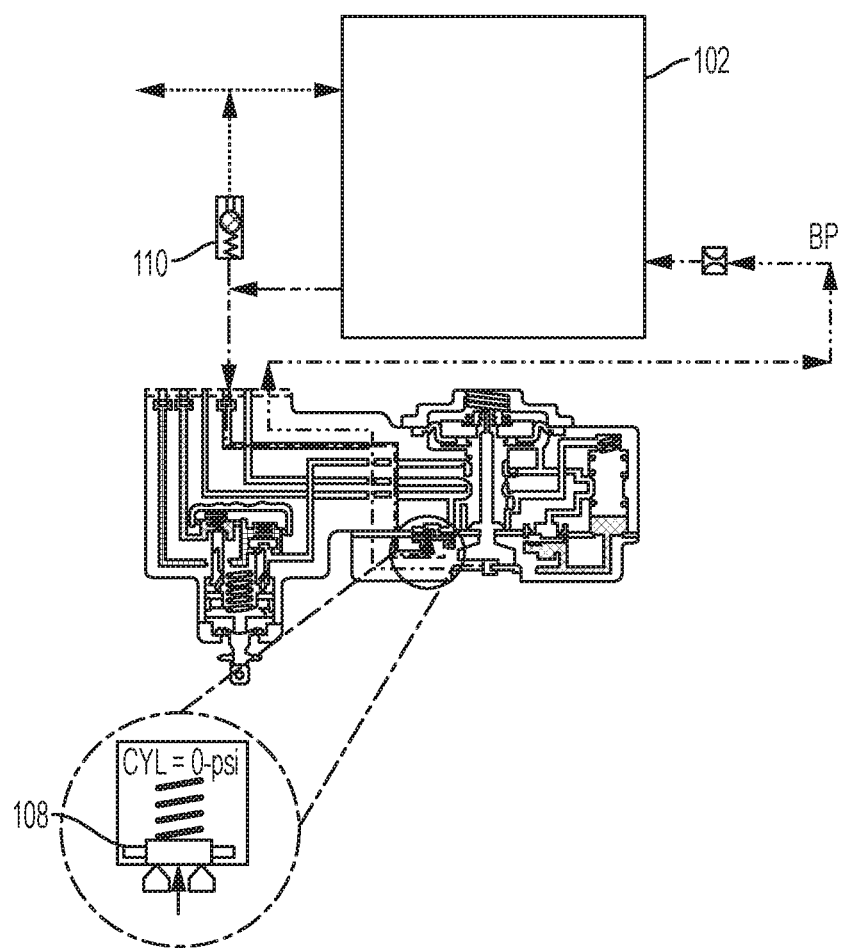
FIG. 13A is a schematic view of output from the cylinder maintaining valve arrangement of FIG. 1, showing a release position.
FIG. 13B is an enlarged schematic view of a retaining check valve of FIG. 13.
Figures 14A, 14B:
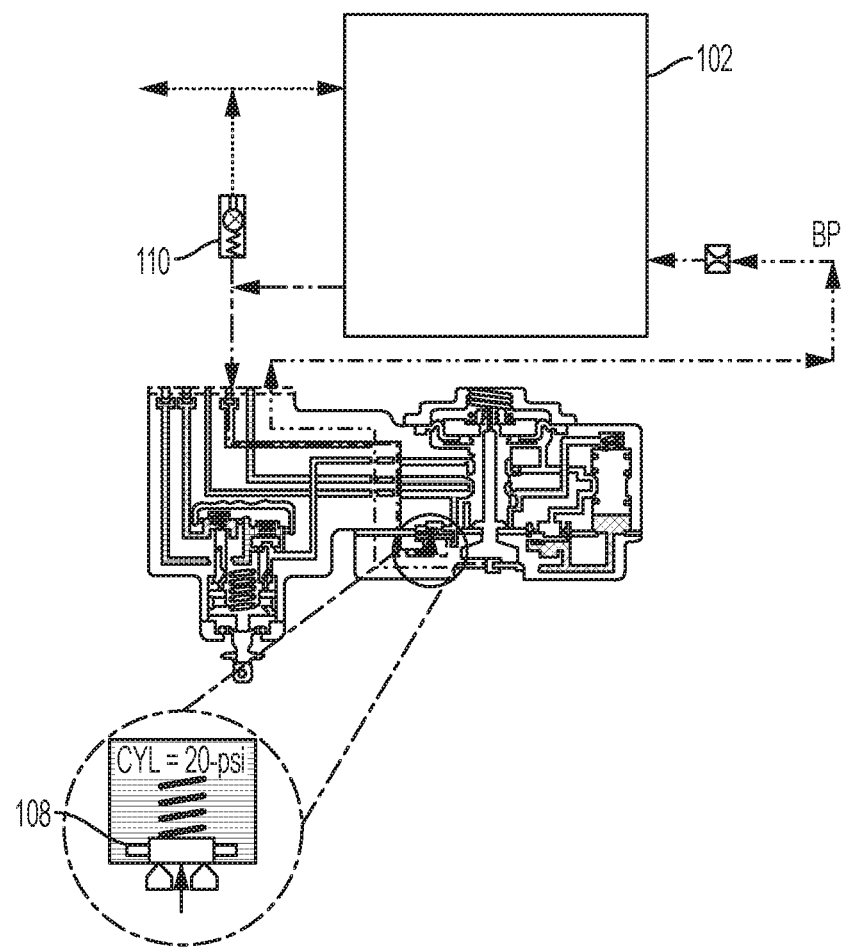
FIG. 14A is a schematic view of output from the cylinder maintaining valve arrangement of FIG. 1, showing an application position with no brake cylinder leakage.
FIG. 14B is an enlarged schematic view of a retaining check valve of FIG. 14.
Figures 15A, 15B:
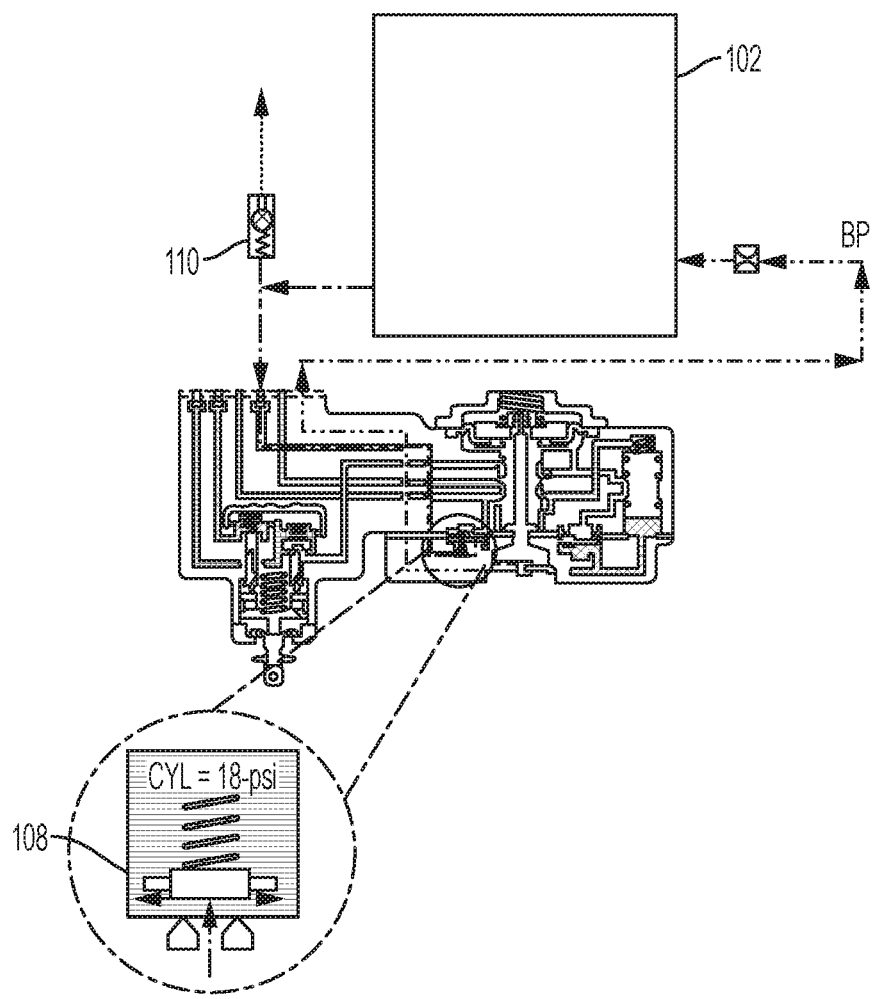
FIG. 15A is a schematic view of output from the cylinder maintaining valve arrangement of FIG. 1, showing an application position with brake cylinder leakage.
FIG. 15B is an enlarged schematic view of a retaining check valve of FIG. 15.
Figures 16A, 16B:
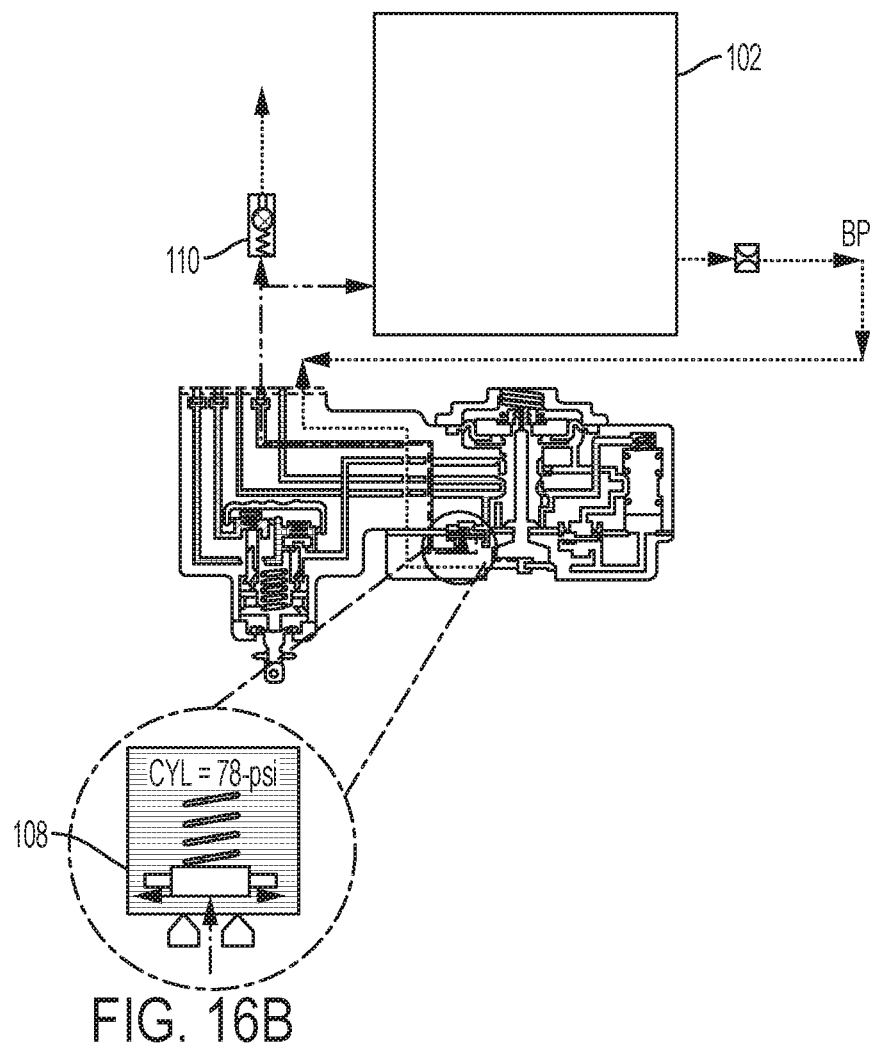
FIG. 16A is a schematic view of output from the cylinder maintaining valve arrangement of FIG. 1, showing an emergency application position after maintaining.
FIG. 16B is an enlarged schematic view of a retaining check valve of FIG. 16.
Figure 17:
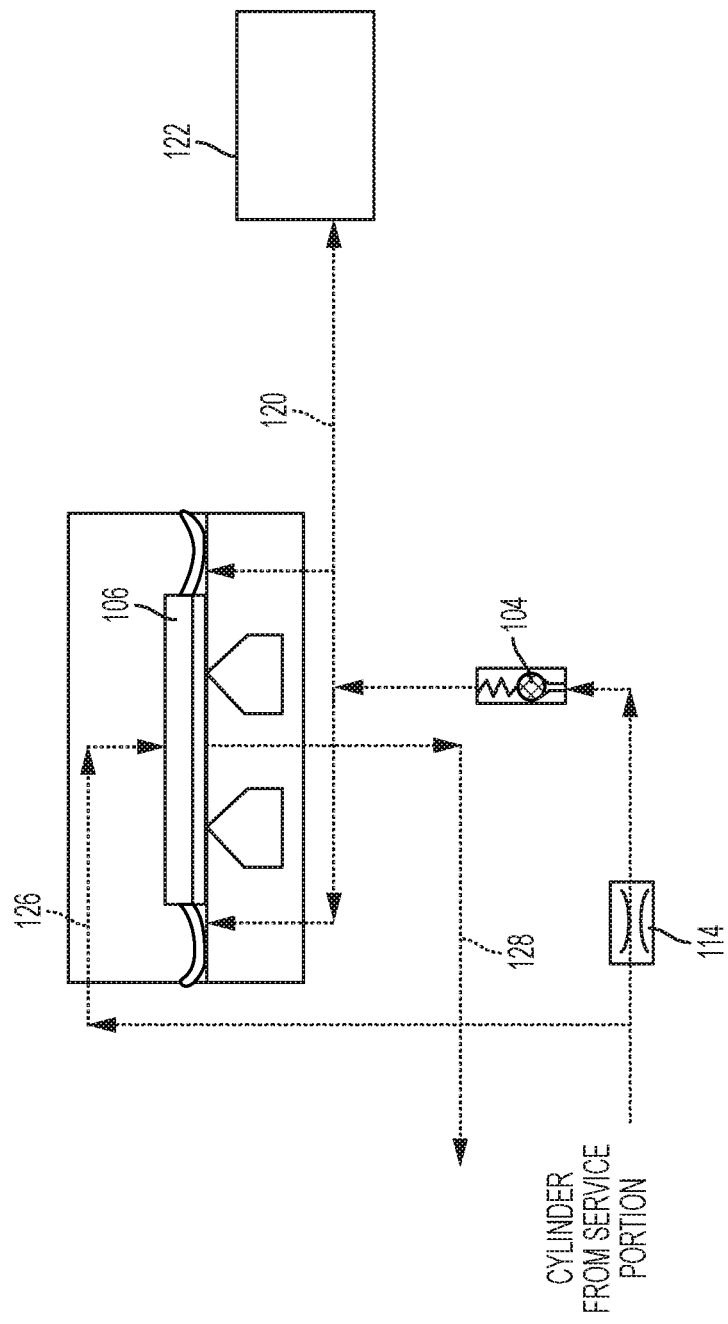
FIG. 17 is a schematic view of a reset valve of FIG. 1, showing a release position.
Figure 18:
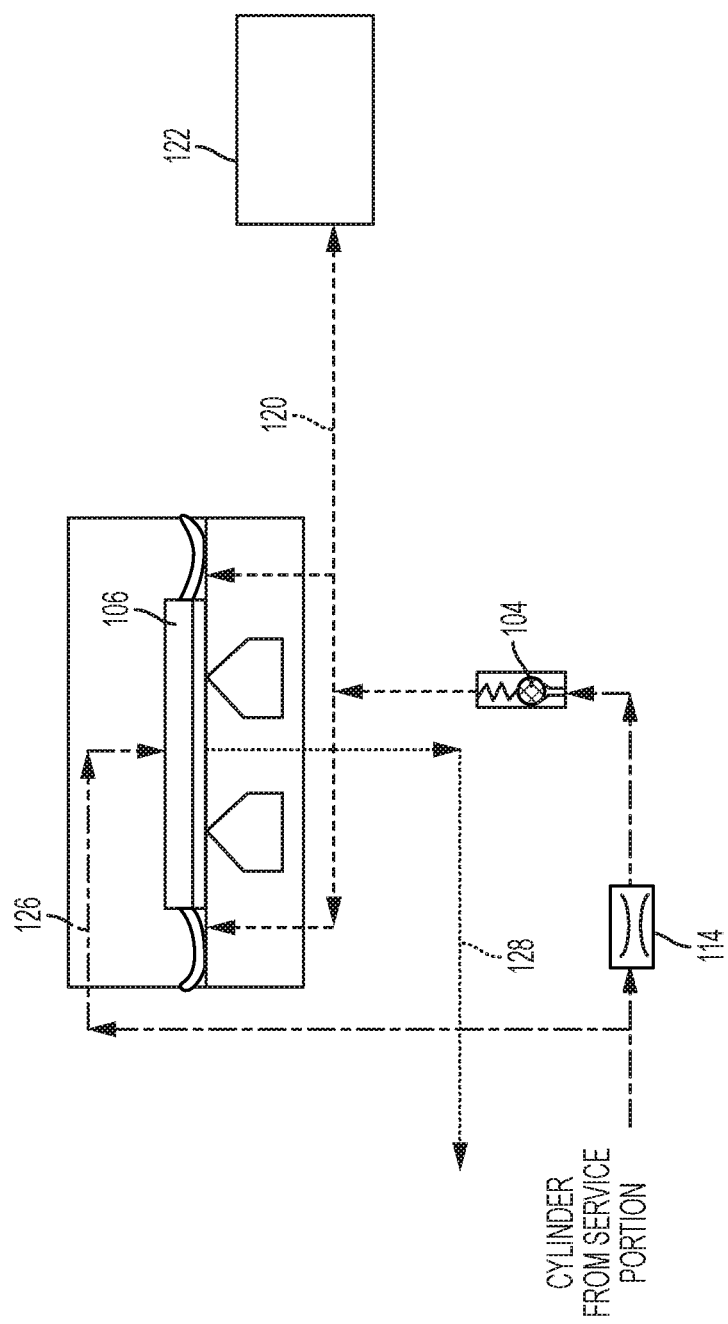
FIG. 18 is a schematic view of a reset valve of FIG. 1, showing an initial application position.
Figure 19:
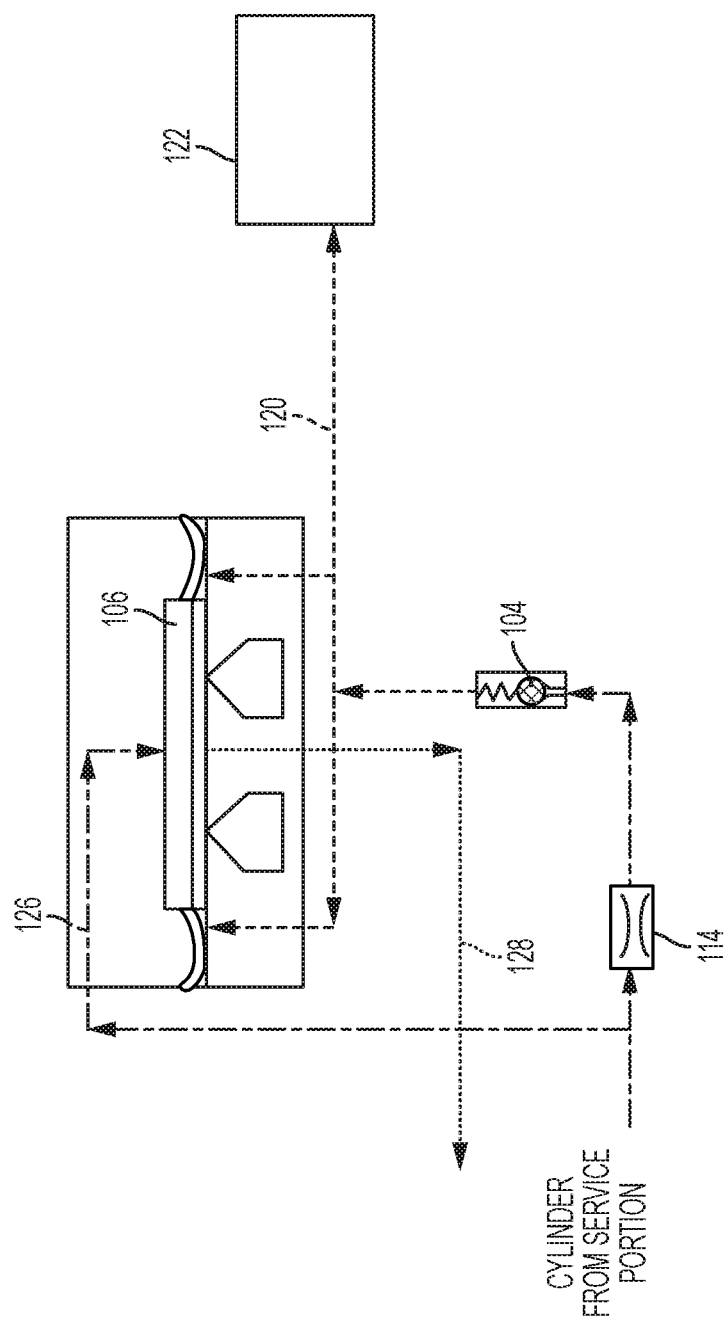
FIG. 19 is a schematic view of a reset valve of FIG. 1, showing an application position.
Figure 20:
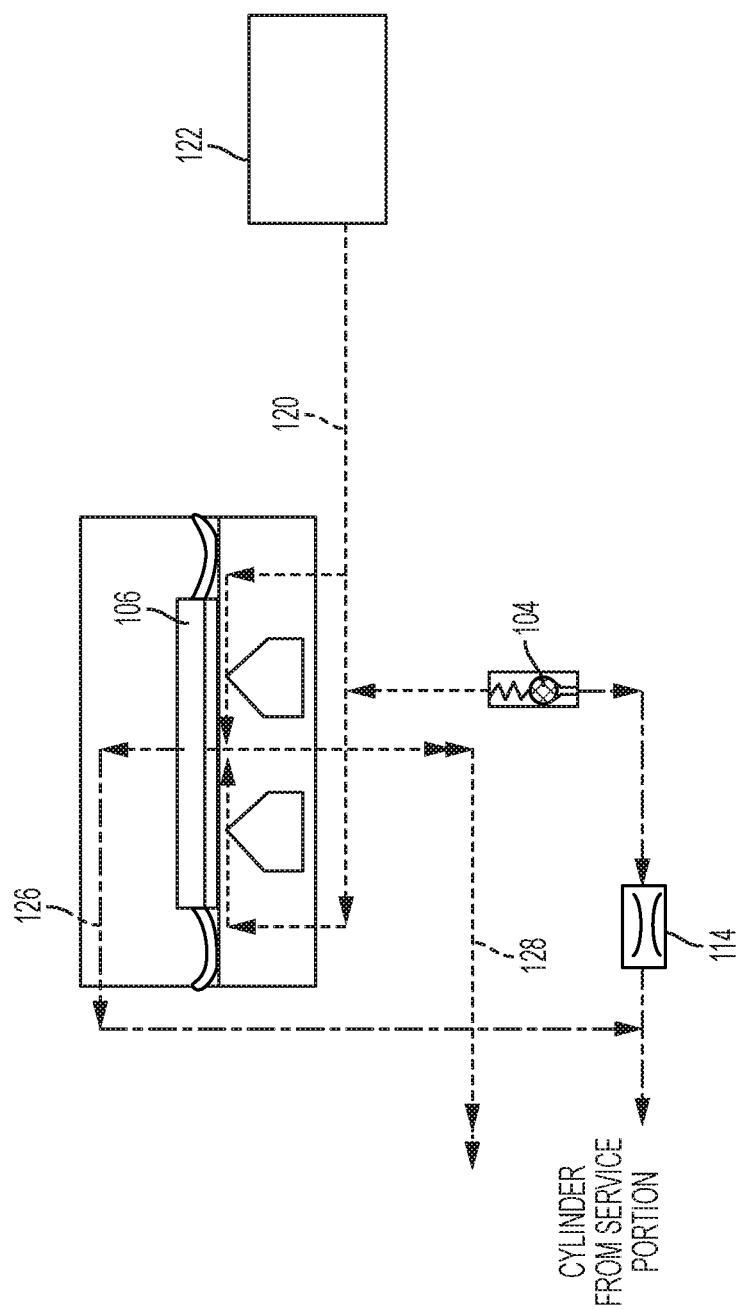
FIG. 20 is a schematic view of a reset valve of FIG. 1, showing a release position after an application.

Referring to FIGS. 10-12, the operation of the main valve 102 is shown. In a release position, shown in FIG. 10, the brake cylinder pressure is approximately 0 psi and the pressure of the reference volume is also approximately 0 psi. The second diaphragm 144 and reset spring 146 provide an upward force with brake pipe passage 124 being isolated from the CM out passage 130. During application with no brake cylinder leakage, shown in FIG. 11, the brake cylinder may have a pressure of 20 psi with a corresponding pressure of 19 psi in the reference volume 122 provided via the reference volume valve 104 as discussed above. The force provided by the spring 138 and the cylinder pressure is greater than the pressure of the reference volume 122 such that the brake pipe remains isolated from the CM out passage. With respect to the second diaphragm 144 and the reset spring 146 in the applied/no leakage state, the cylinder pressure is greater than 12 psi and the second diaphragm 144 and the reset spring 146 move away from the valve member 140. During application with brake cylinder leakage, shown in FIG. 12, the cylinder pressure may be 17 psi with the pressure of the reference volume 122 being 19 psi. The force of the spring 138 and the cylinder pressure (17 psi) is less than the force from the reference volume 122 pressure (19 psi) such that the valve member 140 moves to place the brake pipe in fluid communication with the CM out passage 130 to feed brake pipe pressure to the brake cylinder until about 2-3 psi of the original target pressure of 20 psi.

Referring to FIGS. 13A-16B, the operation of the first and second retaining check valves 108, 110 is shown. In the release position, shown in FIGS. 13A and 13B, the brake cylinder pressure is approximately 0 psi, the reference volume pressure is approximately 0 psi, and the pressure from the CM out passage 130 is approximately 0-2 psi. The first retaining valve 108 remains seated. In the application position with no leakage, shown in FIGS. 14A and 14B, the brake cylinder pressure may be approximately 20 psi, the reference volume 122 pressure is approximately 19 psi, and the cylinder maintaining pressure via the CM out passage 130 is approximately 0 psi and the first retaining valve 108 remains seated. In the application position with leakage, shown in FIGS. 15A and 15B, the brake cylinder pressure decreases below the reference volume pressure 122 and the valve member 140 places the brake pipe passage 124 in fluid communication with the CM out passage 130. The pressure from the CM out passage 130 unseats the first retaining check valve 108 with the brake pipe flowing through the CM out passage 130, through the first retaining check valve 108, through the brake cylinder passage 126, and to the brake cylinder to increase the brake cylinder pressure to the targeted brake cylinder pressure. During an emergency application after actuations of the main valve 102, shown in FIGS. 16A and 16B, the brake pipe is approximately 0 psi, the pressure of the CM out passage 130 is approximately 0 psi, and the first retaining valve 108 isolates the brake cylinder from the CM out passage 130.

Referring to FIGS. 17-20, the operation of the reference volume exhaust valve 106 is shown. In the release position, shown in FIG. 17, the brake cylinder pressure is approximately 0 psi, the reference volume 122 pressure is approximately 0 psi, and the valve 106 remains seated with the reference volume 122 isolated from the retainer exhaust passage 128. In the initial application position, shown in FIG. 18, the brake cylinder pressure increases, the brake cylinder feed choke 114 restricts the pressure increase to the reference volume valve 104 with the reference volume valve 104 ensure the reference volume 122 is 1 psi less than the brake cylinder pressure, and the brake cylinder pressure is greater than the reference volume 122 pressure such that the reference volume exhaust valve 106 is seated to isolate the reference volume 122 from the retainer exhaust passage 128. In an application position after initial application, shown in FIG. 19, the brake cylinder pressure is equal to the reference volume 122 pressure plus 1 psi, the reference volume valve 104 ensure the reference volume 122 is 1 psi less than the brake cylinder pressure, and the brake cylinder pressure is greater than the reference volume 122 pressure to seat the reference volume exhaust valve 106 such that the reference volume exhaust valve 106 is seated to isolate the reference volume 122 from the retainer exhaust passage 128. After release of an application, shown in FIG. 20, the brake cylinder pressure is directed to exhaust, such as port 10, at the service slide valve. The brake cylinder pressure decreases below the reference volume 122 pressure and the reference volume exhaust valve 106 lifts from its seat to place the reference volume 122 in fluid communication with the retainer exhaust passageway 128 and ultimately exhaust, such as port 10.

While several embodiments were described in the foregoing detailed description, those skilled in the art may make modifications and alterations to these embodiments without departing from the scope and spirit of the invention. Accordingly, the foregoing description is intended to be illustrative rather than restrictive.

The invention claimed is:

1. A brake cylinder maintaining system comprising:
a main valve comprising a first diaphragm, a second diaphragm, and a valve member, the first diaphragm having air at a reference pressure on one side of the first diaphragm and the air at a brake cylinder pressure on an opposite side of the first diaphragm, the second diaphragm having the air at the brake cylinder pressure on one side of the second diaphragm, the first diaphragm configured to move toward a first position and toward a second position based on a first differential between the reference pressure and the brake cylinder pressure, the second diaphragm configured to move toward the first position and toward the second position based on a second differential between the brake cylinder pressure and a predetermined pressure value, the valve member configured to place a brake cylinder in fluid communication with a brake pipe responsive to the first and second diaphragm both moving toward the second position, the valve member configured to isolate the brake cylinder from the brake pipe responsive to the first diaphragm or the second diaphragm moving toward the first position; and
a brake cylinder feed choke in fluid communication with the first and second diaphragms, the brake cylinder feed choke configured to reduce flow of the air at the brake cylinder pressure to the main valve during a brake application.

2. The system of claim 1, further comprising:
a reference volume configured to receive the air at the reference pressure; and
a reference volume valve configured to direct the air at a target brake cylinder pressure into the reference volume.

3. The system of claim 2, further comprising:
a reference volume exhaust valve configured to fluidly couple the reference volume with an exhaust after release of the brake application.

4. The system of claim 3, wherein the reference volume exhaust valve comprises a diaphragm check valve having the air at the brake cylinder pressure on one side and the air at the reference pressure on an opposite side of the diaphragm check valve, the reference volume exhaust valve configured to unseat and connect the reference volume with the exhaust responsive to a reference volume pressure of the air in the reference volume exceeding the brake cylinder pressure.

5. The system of claim 4, wherein the reference volume valve comprises a reference check valve having the reference volume on one side of the reference check valve and the air at the brake cylinder pressure on an opposite side of the reference check valve via the brake cylinder feed choke, the reference volume valve configured to direct the air at the target brake cylinder pressure into the reference volume.

6. The system of claim 1, wherein the first diaphragm is biased toward the first position via a first spring.

7. The system of claim 6, wherein the second diaphragm is biased toward the first position via a reset spring, wherein the predetermined pressure value is based on the reset spring.

8. The system of claim 1, wherein the main valve comprises a cylinder maintaining output passage and a brake pipe passage, the cylinder maintaining output passage in fluid communication with the brake pipe passage responsive to the first and second diaphragms both moving toward the second position.

9. The system of claim 8, wherein the cylinder maintaining output passage is isolated from the brake pipe passage responsive to the first diaphragm or the second diaphragm moving toward the first position.

10. The system of claim 9, further comprising:
a retaining valve in fluid communication with a brake cylinder passage and the cylinder maintaining output passage, the retaining valve configured to prevent flow of the air from the brake cylinder passage to the cylinder maintaining output passage.

11. A brake cylinder maintaining system comprising:
a hot wheel protection valve arrangement comprising a valve member configured to connect a brake cylinder to an exhaust responsive to a pressure of air in the brake cylinder exceeding a target pressure; and
a brake cylinder maintaining arrangement comprising a main valve including a first diaphragm, a second diaphragm, and a valve member, the first diaphragm having the air at a reference pressure on one side of the first diaphragm and the air at a brake cylinder pressure on an opposite side of the first diaphragm, the second diaphragm having the air at a brake cylinder pressure on one side of the second diaphragm, the first diaphragm configured to move toward a first position and toward a second position based on a differential between the reference pressure and the brake cylinder pressure, the second diaphragm configured to move toward the first position and toward the second position responsive to the brake cylinder pressure exceeding a predetermined value, the valve member configured to place a brake cylinder in fluid communication with a brake pipe responsive to the first and second diaphragm both moving toward the second position and configured to isolate the brake cylinder from the brake pipe responsive to either the first diaphragm or the second diaphragm moving toward the first position.

12. The system of claim 11, further comprising:
a brake cylinder feed choke in fluid communication with the first and second diaphragms, the brake cylinder feed choke configured to reduce flow of the air at the brake cylinder pressure to the main valve during a brake application.

13. The system of claim 11, further comprising:
a reference volume configured to receive the air at the reference pressure; and
a reference volume valve configured to direct the air at a target brake cylinder pressure into the reference volume.

14. The system of claim 13, further comprising:
a reference volume exhaust valve configured to place the reference volume in fluid communication with an exhaust responsive to release of a brake application.

15. The system of claim 14, wherein the reference volume exhaust valve comprises a diaphragm check valve having the air at the brake cylinder pressure on one side and the air at the reference pressure on an opposite side of the reference volume exhaust valve, the reference volume exhaust valve configured to unseat and connect the reference volume with the exhaust responsive to pressure of the air in the reference volume exceeding pressure of the air in the brake cylinder.

16. The system of claim 15, wherein the reference volume valve comprises a check valve with the reference volume on one side and the air at the brake cylinder pressure on an opposite side of the reference volume valve via the brake cylinder feed choke, the reference volume valve configured to direct the air into the reference volume at the target brake cylinder pressure during charging of the brake cylinder.

17. The system of claim 11, wherein the first diaphragm is biased toward the first position via a first spring, and wherein the second diaphragm is biased toward the first position via a reset spring, the predetermined value at least partially based on the reset spring.

18. The system of claim 11, wherein the main valve comprises a cylinder maintaining output passage and a brake pipe passage, the cylinder maintaining output passage in fluid communication with the brake pipe passage responsive to the first and second diaphragms moving toward the second position.

19. The system of claim 18, wherein the cylinder maintaining output passage is isolated from the brake pipe passage responsive to either the first diaphragm or the second diaphragm moving toward the first position, and further comprising:
a retaining valve in fluid communication with a brake cylinder passage and the cylinder maintaining output passage, the retaining valve configured to prevent flow of the air from the brake cylinder passage to the cylinder maintaining output passage.

20. A protection valve comprising:
a main body having interior chambers with a piston disposed in the interior chambers of the main body and a bushing coupled with the piston in the interior chambers of the main body, the bushing having a venting passageway;
a first diaphragm coupled with the piston between a brake cylinder chamber of the interior chambers of the main body and the bushing, the brake cylinder chamber configured to be fluidly coupled with a brake cylinder of a brake system, the first diaphragm defining an exhaust chamber of the interior chambers of the main body between the first diaphragm and the bushing, the exhaust chamber fluidly coupled with an exhaust line of the brake system; and a second diaphragm coupled with the piston between a reservoir chamber of the interior chambers of the main body and the bushing, the second diaphragm defining a brake pipe chamber of the interior chambers of the main body between the bushing and the second diaphragm, the reservoir chamber configured to be fluidly coupled with an emergency reservoir of the brake system, the brake pipe chamber configured to be fluidly coupled with a brake pipe of the brake system, wherein the piston and the bushing are configured to move toward a venting position with the venting passageway in the bushing fluidly coupling the brake cylinder of the brake system with the exhaust line of the brake system while a pressure of a fluid in the brake cylinder chamber is at least a threshold pressure, wherein the piston and the bushing are configured to move toward a non-venting position with the venting passageway in the bushing not fluidly coupling the brake cylinder of the brake system with the exhaust line of the brake system while the pressure of the fluid in the brake cylinder chamber is smaller than the threshold pressure.

* * * * *